(12) United States Patent
Ryu et al.

(10) Patent No.: US 11,317,386 B2
(45) Date of Patent: Apr. 26, 2022

(54) METHOD AND DEVICE FOR TRANSMITTING UPLINK CONTROL CHANNEL IN COMMUNICATION SYSTEM

(71) Applicant: Samsung Electronics Co., Ltd, Suwon-si (KR)

(72) Inventors: Hyunseok Ryu, Yongin-si (KR); Peng Xue, Suwon-si (KR); Hyunkyu Yu, Suwon-si (KR); Sangwon Choi, Seoul (KR); Kuyeon Whang, Gwangmyeong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 180 days.

(21) Appl. No.: 16/496,927

(22) PCT Filed: Mar. 20, 2018

(86) PCT No.: PCT/KR2018/003228
§ 371 (c)(1),
(2) Date: Sep. 23, 2019

(87) PCT Pub. No.: WO2018/174522
PCT Pub. Date: Sep. 27, 2018

(65) Prior Publication Data
US 2020/0107317 A1 Apr. 2, 2020

(30) Foreign Application Priority Data

Mar. 23, 2017 (KR) .................. 10-2017-0037150
Jun. 14, 2017 (KR) .................. 10-2017-0074779

(51) Int. Cl.
*H04W 72/04* (2009.01)
*H04L 5/00* (2006.01)

(52) U.S. Cl.
CPC ....... *H04W 72/0413* (2013.01); *H04L 5/0007* (2013.01); *H04L 5/0048* (2013.01); *H04W 72/044* (2013.01)

(58) Field of Classification Search
CPC ... H04L 5/0007; H04L 5/0048; H04L 5/0051; H04L 5/0053; H04W 72/0413; H04W 72/044
See application file for complete search history.

(56) References Cited

U.S. PATENT DOCUMENTS 8,743,771 B2   6/2014   Park et al.
9,888,462 B2   2/2018   Xia et al.
(Continued)

FOREIGN PATENT DOCUMENTS

CN   104272609 A   1/2015
CN   105141399 A   12/2015
(Continued)

OTHER PUBLICATIONS

International Search Report dated Jun. 28, 2018 in connection with International Patent Application No. PCT/KR2018/003228, 2 pages.
(Continued)

*Primary Examiner* — Asad M Nawaz
*Assistant Examiner* — Zhaohui Yang

(57) ABSTRACT

The present invention relates to: a communication technique for merging, with IoT technology, a 5G communication system for supporting a data transmission rate higher than that of a 4G system; and a system therefor. The present invention can be applied to intelligent services (for example, smart home, smart building, smart city, smart car or connected car, health care, digital education, retail, security and safety-related services, and the like) on the basis of 5G communication technology and IoT-related technology. In addition, the purpose of the present invention is to provide (Continued)

an operating method and device of a terminal and a base station, which are for transmitting uplink control information in a communication system.

12 Claims, 27 Drawing Sheets

(56) References Cited

U.S. PATENT DOCUMENTS

| | | | |
|---|---|---|---|
| 10,911,097 B2* | 2/2021 | Kim | H04L 5/10 |
| 10,912,068 B2* | 2/2021 | Yin | H04L 5/005 |
| 2012/0026934 A1 | 2/2012 | Park et al. | |
| 2012/0327875 A1 | 12/2012 | Han et al. | |
| 2013/0039307 A1 | 2/2013 | Han et al. | |
| 2013/0114472 A1* | 5/2013 | Tamaki | H04L 5/14 370/280 |
| 2015/0078272 A1 | 3/2015 | Kim et al. | |
| 2018/0192416 A1* | 7/2018 | Yin | H04L 1/1607 |
| 2019/0081722 A1* | 3/2019 | Takeda | H04L 27/2607 |
| 2019/0090258 A1 | 3/2019 | Ryu et al. | |

FOREIGN PATENT DOCUMENTS

| | | |
|---|---|---|
| CN | 105391533 A | 3/2016 |
| JP | 2016-527758 A | 9/2016 |
| KR | 10-0930719 B1 | 12/2009 |
| KR | 10-2010-0097063 A | 9/2010 |
| KR | 10-2015-0089715 A | 8/2015 |
| WO | 2010/098584 A2 | 9/2010 |
| WO | 2017/019132 A1 | 2/2017 |
| WO | 2017/150925 A1 | 9/2017 |

OTHER PUBLICATIONS

Written Opinion of the International Searching Authority dated Jun. 28, 2018 in connection with International Patent Application No. PCT/KR2018/003228, 7 pages.

The First Office Action dated Nov. 11, 2021, in connection with Chinese Application No. 201880018166.2, 12 pages.

Alcatel-Lucent Shanghai Bell, et al., "UCI Transmission enhancement," R1-113329, 3GPP TSG RAN WG1 Meeting #66bis, Zhuhai, China, Oct. 10-14, 2011, 3 pages.

Samsung, "Pucch Resource Allocation for UL CoMP," R1-122247, 3GPP TSG RAN WG1 Meeting #69, Prague, Czech Republic, May 21-25, 2012, 3 pages.

* cited by examiner

METHOD AND DEVICE FOR TRANSMITTING UPLINK CONTROL CHANNEL IN COMMUNICATION SYSTEM

CROSS-REFERENCE TO RELATED APPLICATIONS

This application is a 371 of International Application No. PCT/KR2018/003228 filed on Mar. 20, 2018, which claims priority to Korean Patent Application No. 10-2017-0037150 filed on Mar. 23, 2017 and Korean Patent Application No. 10-2017-0074779 filed on Jun. 14, 2017, the disclosures of which are herein incorporated by reference in their entirety.

BACKGROUND

1. Field

The disclosure relates to a communication system, and more particularly, to a method and a device for transmitting an uplink control channel of a terminal in a communication system.

2. Description of Related Art

To meet the demand for wireless data traffic, which has increased since the commercialization of 4G communication systems, efforts have been made to develop an improved 5G communication system or a pre-5G communication system. Therefore, the 5G communication system or the pre-5G communication system is called a "beyond-4G-network communication system" or a "post-LTE system".

Consideration is being given to implementation of the 5G communication system in super-high-frequency (mmWave) bands (e.g., a 60 GHz band) so as to accomplish higher data rates. In order to reduce pathloss of radio waves and increase the propagation distance of radio waves in super-high-frequency bands, techniques, such as beamforming, massive multiple-input multiple-output (MIMO), full-dimensional MIMO (FD-MIMO), array antennas, analog beamforming, and large-scale antennas, are being discussed in 5G communication systems.

In addition, development is under-way for system network improvement in 5G communication systems based on evolved small cells, advanced small cells, cloud radio access networks (cloud RANs), ultra-dense networks, device-to-device (D2D) communication, wireless backhaul, moving networks, cooperative communication, coordinated multi-point (CoMP), reception-end interference cancellation, and the like.

Furthermore, in the 5G system, hybrid FSK and QAM modulation (FQAM) and sliding window superposition coding (SWSC), as advanced coding modulation (ACM), and filter bank multi-carrier (FBMC), non-orthogonal multiple access (NOMA), and sparse code multiple access (SCMA), as advanced access technologies, are being developed.

Meanwhile, the Internet, which to date has been a human-centered connectivity network in which humans generate and consume information, is now evolving to the Internet of things (IoT), where distributed entities, or "things", exchange and process information. The Internet of everything (IoE), which is a combination of IoT technology and big-data processing technology through connection with a cloud server, has emerged. As technology elements, such as sensing technology, wired/wireless communication and network infrastructure, service interface technology, and security technology, have been demanded for IoT implementation, techniques for connecting things, such as a sensor network, machine-to-machine (M2M) communication, machine-type communication (MTC), and the like, have been recently researched. An IoT environment may provide intelligent Internet technology (IT) services that create new value in people's lives by collecting and analyzing data generated from connected things. The IoT may be applied to a variety of fields, such as those of smart homes, smart buildings, smart cities, smart cars or connected cars, smart grids, healthcare, smart appliances, and advanced medical services, through convergence and combination between existing information technology (IT) and various industries.

In line with this, various attempts have been made to apply 5G communication systems to IoT networks. For example, technologies, such as a sensor network, machine-to-machine (M2M) communication, machine-type communication (MTC), and the like, are being implemented using 5G communication techniques, such as beamforming, MIMO, array antennas, and the like. The application of a cloud radio access network (cloud RAN) as the above-described big-data processing technology may also be considered as an example of convergence between the 5G technology and the IoT technology.

Meanwhile, in the conventional LTE, a terminal may transmit uplink control information (UCI) to a base station, and the uplink control information may include at least one piece of hybrid automatic repeat request (HARD) ACK/NACK, channel quality information (CQI), precoding matrix indication (PMI) information, rank indication (RI) information, and scheduling request (SR) information. The control information may be transmitted through a physical uplink control channel (PUCCH), which is an uplink control channel, or may be transmitted along with data through a physical uplink shared channel (PUSCH), which is an uplink data channel. With regard to time-frequency transmission positions of the physical uplink control channel, the uplink control channel may be transmitted for one subframe on the time axis, and may be transmitted at both ends of a system bandwidth on the frequency axis. In this case, frequency diversity may be obtained by performing frequency hopping on a slot basis.

This operation may not satisfy low latency, which is one of the requirements for 5G communication systems, and may not support the scalability of physical uplink control channel design. For example, one slot {i.e., a transmission time interval (TTI)} may include 7 symbols in a specific service in order to satisfy low latency. In this case, the number of symbols of the physical uplink control channel may be varied depending on the number of symbols for transmitting the physical downlink control channel (PDCCH) in consideration of a time division duplexing (TDD) system. Therefore, it is necessary to design a scalable physical uplink control channel in such a scenario.

SUMMARY

It is an aspect of the disclosure to provide a method for operating a terminal and a base station in order to transmit uplink control information in a communication system, and devices thereof.

In order to solve the problems above, a method of a terminal may include: generating uplink control information; generating a demodulation reference signal (DMRS) for the uplink control information; mapping the uplink control information and the DMRS with a plurality of symbols allocated to the uplink control information; and transmitting the uplink control information and the DMRS to a base station, wherein the DMRS is mapped with an odd-numbered symbol of the plurality of symbols.

In order to solve the problems above, a terminal may include: a transceiver configured to transmit and receive signals; and a controller configured to generate uplink control information, generate a demodulation reference signal (DMRS) for the uplink control information, map the uplink control information and the DMRS with a plurality of symbols allocated to the uplink control information, and transmit the uplink control information and the DMRS to a base station, wherein the DMRS is mapped with an odd-numbered symbol of the plurality of symbols.

In order to solve the problems above, a method of a base station may include: receiving, from a terminal, uplink control information and a demodulation reference signal (DMRS) for the uplink control information in a plurality of symbols; and based on the demodulation reference signal, processing the uplink control information, wherein the DMRS is mapped with an odd-numbered symbol of the plurality of symbols.

In order to solve the problems above, a base station may include: a transceiver configured to transmit and receive signals; and a controller configured to receive, from a terminal, uplink control information and a demodulation reference signal (DMRS) for the uplink control information in a plurality of symbols and configured to, based on the demodulation reference signal, process the uplink control information, wherein the DMRS is mapped with an odd-numbered symbol of the plurality of symbols.

A method for transmitting uplink control information according to the embodiment of the disclosure is able to efficiently transmit uplink control information, which may have various sizes of bits without deterioration in performance, and enables efficient design of a physical uplink control channel so as to have various numbers of symbols.

DETAILED DESCRIPTION

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

Figure 1:
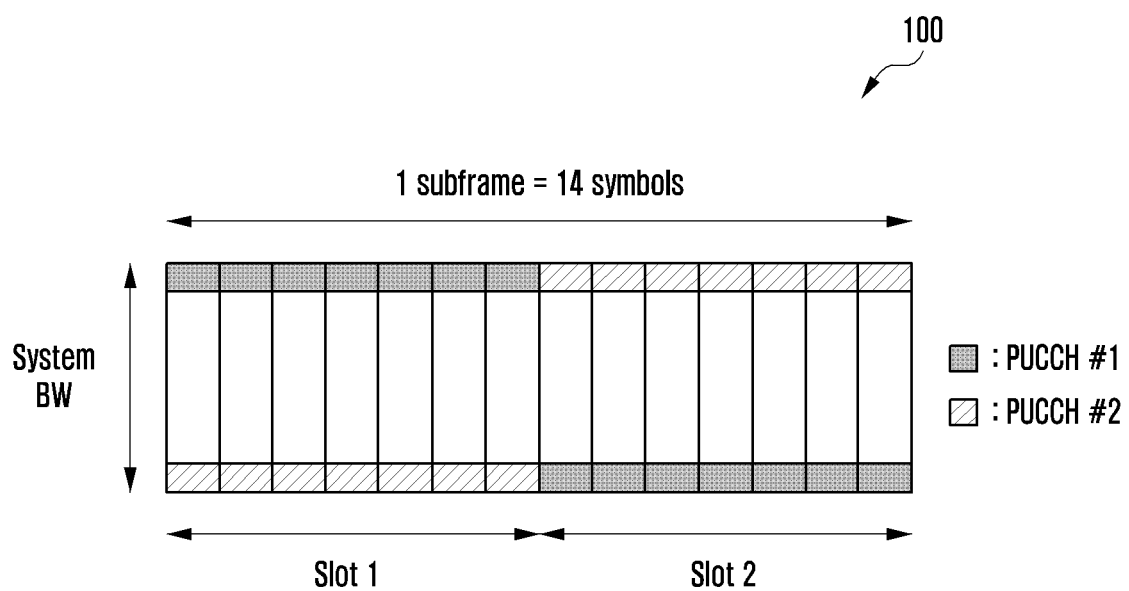
FIG. 1 illustrates an example of the structure of an LTE uplink control channel using a normal cyclic prefix (NCP).
Figure 2:
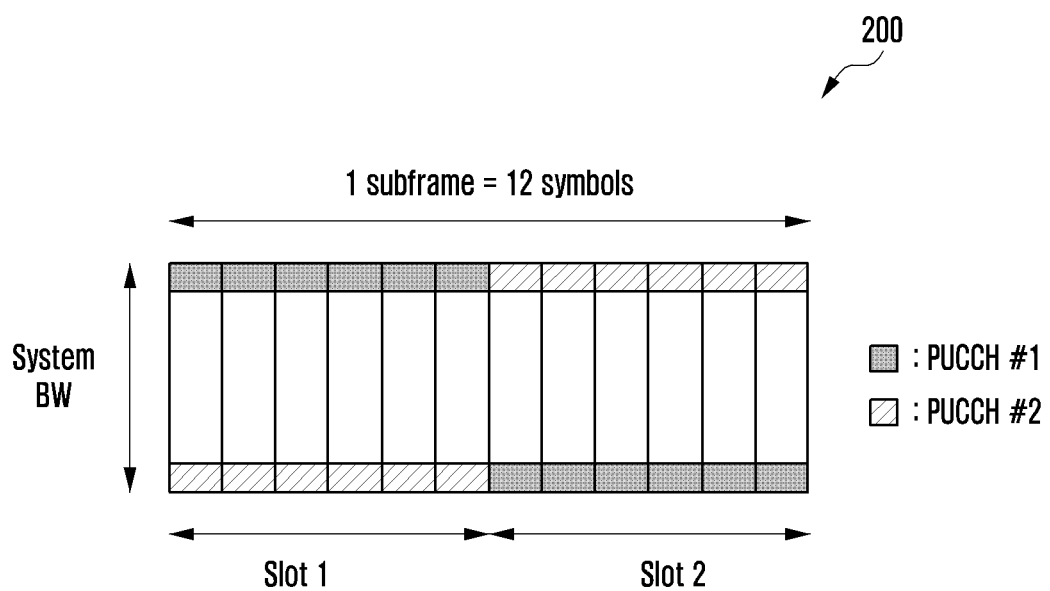
FIG. 2 illustrates an example of the structure of an LTE uplink control channel using an extended cyclic prefix (ECP).

In the conventional LTE, as shown in FIG. 1 or 2, physical uplink control channels may be transmitted at both ends of a system bandwidth in a single subframe including two slots. FIG. 1 illustrates the case of using a normal cyclic prefix (NCP), and FIG. 2 illustrates the case of using an extended cyclic prefix (ECP). In the case of using the NCP, one subframe may include 14 discrete Fourier transform-spread-orthogonal frequency division multiplexing (DFT-S-OFDM) symbols, and one slot may include 7 DFT-S-OFDM symbols as shown in FIG. 1. In the case of using the ECP, one subframe may include 12 DFT-S-OFDM (discrete Fourier transform-spread-orthogonal frequency division multiplexing) symbols, and one slot may include 7 DFT-S-OFDM symbols as shown in FIG. 2. As shown in FIGS. 1 and 2, PUCCH #1, which is transmitted at the upper end of the system bandwidth in slot 1, may be transmitted at the lower end of the system bandwidth in slot 2 in order to obtain frequency diversity. Likewise, PUCCH #2, which is transmitted at the lower end of the system bandwidth in slot 1, may be transmitted at the upper end of the system bandwidth in slot 2 in order to obtain frequency diversity. Although not shown in FIGS. 1 and 2, a sounding reference signal (SRS) may be transmitted in the last symbol of the subframe (the $14^{th}$ symbol in the NCP and the $12^{th}$ symbol in the ECP). If the SRS is transmitted in the last symbol, the last symbol used for the transmission of a PUCCH may be punctured.

Meanwhile, in the conventional LTE system, a transmission time interval (TTI) of data is 1 subframe (1 ms). In contrast, a TTI may be configured as a slot in 5G communication systems in order to reduce latency. That is, one slot may be one TTI. In this case, one slot may include 7 DFT-S-OFDM symbols or seven cyclic prefix-orthogonal frequency division multiplexing (CP-OFDM) symbols, or may include 14 DFT-S-OFDM symbols or 14 CP-OFDM symbols. A base station may inform a terminal of whether one slot includes 7 symbols or 14 symbols. In addition, in the prior art, downlink control information transmitted from the base station to the terminal and uplink control information transmitted from the terminal to the base station are transmitted in different transmission time intervals (TTIs) from each other. For example, the base station transmits downlink control information to the terminal in the $n^{th}$ subframe, and the terminal transmits uplink control information to the base station in the $(n+4)^{th}$ subframe. For example, the terminal may transmit, to the base station, ACK/NACK information in response to the reception of the downlink control information in the $(n+4)^{th}$ subframe. If the base station receives NACK in the $(n+4)^{th}$ subframe, the base station may retransmit data in the $(n+K)^{th}$ subframe. In this case, the value K may be fixed to 8 in a frequency division duplexing (FDD) system, and may be variable depending on the configuration of a downlink (DL) or uplink(UL) subframe, but may be fixed in a specific configuration in a time division duplexing (TDD) system. This operation may not satisfy low latency, which is one of the requirements for 5G communication systems, and may limit the degree of freedom of a base station scheduler, thereby lowering the flexibility of the base station.

Figure 3:
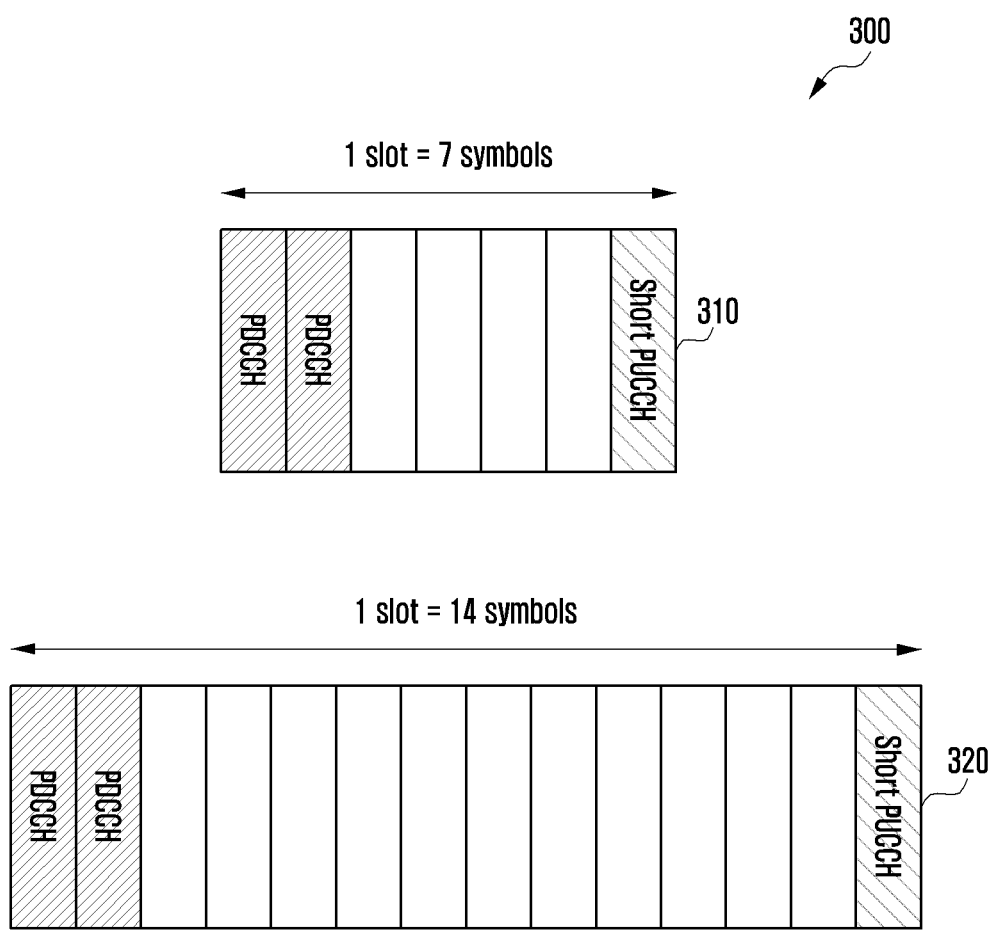
FIG. 3 illustrates an example of the structure of an uplink control channel having a length of one symbol.
Figure 4:
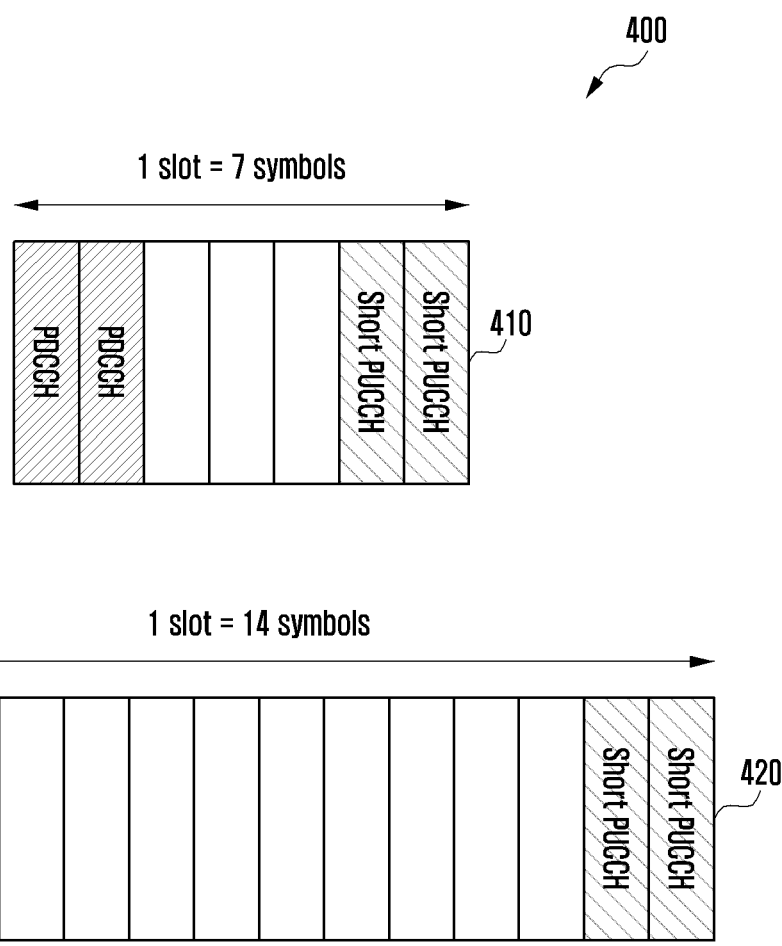
FIG. 4 illustrates an example of the structure of an uplink control channel having a length of two symbols.

A frame structure has been proposed in order to satisfy the above requirements. The subframe structure may be used interchangeably with a "self-contained frame structure", and may denote a frame structure for supporting fast HARQ-ACK or a frame structure for supporting low latency. In this frame structure, the configuration of the subframe may be dynamically changed for each subframe. For example, the $n^{th}$ subframe may be configured to receive downlink data, the $(n+1)^{th}$ subframe may be configured to transmit uplink data, the $(n+2)^{th}$ subframe may be configured to receive downlink data, and the $(n+3)^{th}$ subframe may be configured to transmit uplink control information. Therefore, in the above frame structure, the control channel for transmitting control information in the uplink may be positioned at the last one symbol 310 or 320 of the TTI or at the last two symbols 410 and 420 of the TTI as shown in FIGS. 3 and 4. The PUCCH used to support fast HARQ-ACK is called a "short PUCCH".

Although FIGS. 3 and 4 show that two symbols are assigned to the physical downlink control channel (PDCCH), the PDCCH may be transmitted using one symbol or three or more symbols. Although not shown in FIGS. 3 and 4, in the case where a physical downlink shared channel (PDSCH) for the transmission of downlink data is transmitted after the PDCCH, a gap including one symbol (or two or more symbols) may be provided before the short PUCCH symbol. The gap is intended for the time required for hardware switching between reception and transmission in order for the terminal to perform an operation of transmitting a short PUCCH in the uplink after receiving the PDCCH/PDSCH transmitted in the downlink. Similarly, the gap is intended for the time required for hardware switching between transmission and reception in order for the base station to perform an operation of receiving the short PUCCH transmitted in the uplink after transmitting the PDCCH and the PDSCH in the downlink. Although not shown in FIGS. 3 and 4, in the case where a physical uplink shared channel (PUSCH) for the transmission of uplink data is transmitted after the PDCCH, a gap including one symbol (or two or more symbols) may be provided behind the PDCCH. The gap is intended for the time required for hardware switching between reception and transmission of the terminal or hardware switching between transmission and reception of the base station, as described above. Accordingly, the number of symbols available for the transmission of the PDSCH or the PUSCH may be varied depending on the number of symbols constituting the slot (7 symbols or 14 symbols), the number of symbols of the PDCCH, and the number of symbols constituting the gap.

Meanwhile, as described above, the short PUCCH has the effect of reducing the latency by supporting the HARQ-ACK. However, since the short PUCCH is transmitted using one symbol or two symbols, there may be a limit in securing coverage. Therefore, as shown in FIGS. 1 and 2, a PUCCH that can be transmitted using a plurality of DFT-S-OFDM symbols (or CP-OFDM symbols) may be supported. Such a PUCCH used to support coverage is called a "long PUCCH". The long PUCCH may be processed for frequency division multiplexing (FDM) with the PUSCH, and may then be transmitted. In addition, the long PUCCH may be processed for FDM or TDM (time division multiplexing) with the short PUCCH. Therefore, the number of DFT-S-OFDM symbols (or CP-OFDM symbols) capable of constituting the long PUCCH may be variable as shown in Tables 1 and 2 below.

TABLE 1

| No. | Number of symbols of PDCCH | Number of symbols of gap | Number of symbols of PUCCH | Note | |
|---|---|---|---|---|---|
| 1 | 0 | 0 | 7 | There is no short PUCCH. | FDD system |
| 2 | 0 | 0 | 6 | Last one symbol is used for short PUCCH. | |
| 3 | 0 | 0 | 5 | Last two symbols are used for short PUCCH. | |
| 4 | 1 | 1 | 5 | There is no short PUCCH. | TDD system |
| 5 | 1 | 1 | 4 | Last one symbol is used for short PUCCH. | |
| 6 | 2 | 1 | 4 | There is no short PUCCH. | |

Table 1 above shows an example of the number of symbols constituting the long PUCCH (1 TTI=7 symbols).

TABLE 2

| No. | Number of symbols of PDCCH | Number of symbols of gap | Number of symbols of PUCCH | Note | |
|---|---|---|---|---|---|
| 1 | 0 | 0 | 14 | There is no short PUCCH. | FDD system |
| 2 | 0 | 0 | 13 | Last one symbol is used for short PUCCH. | |
| 3 | 0 | 0 | 12 | Last two symbols are used for short PUCCH. | |
| 4 | 1 | 1 | 12 | There is no short PUCCH. | TDD system |
| 5 | 1 | 1 | 11 | Last one symbol is used for short PUCCH. | |
| 6 | 1 | 1 | 10 | Last two symbols are used for short PUCCH. | |
| 7 | 2 | 1 | 11 | There is no short PUCCH. | |
| 8 | 2 | 1 | 10 | Last one symbol is used for short PUCCH. | |
| 9 | 2 | 1 | 9 | Last two symbols are used for short PUCCH. | |

Table 2 above shows an example of the number of symbols constituting the long PUCCH (1 TTI=14 symbols).

The case where there is no short PUCCH in Tables 1 and 2 may be the case where short PUCCH resources are not configured in the corresponding TTI (slot), or may be the case where a short PUCCH resource is not processed for TDM with a long PUCCH resource (i.e., the case of FDM). In addition, although it is assumed that the gap includes one symbol in the TDD system in Tables 1 and 2, the gap may require two or more symbols in a cell having a large cell radius in consideration of timing advance (TA) of the terminal. Further, although the number of symbols of the PDCCH is assumed to be up to two in the TDD system, three or more symbols may be used. The number of symbols available for the long PUCCH may be more variable in consideration of various cases mentioned above.

Figure 5:
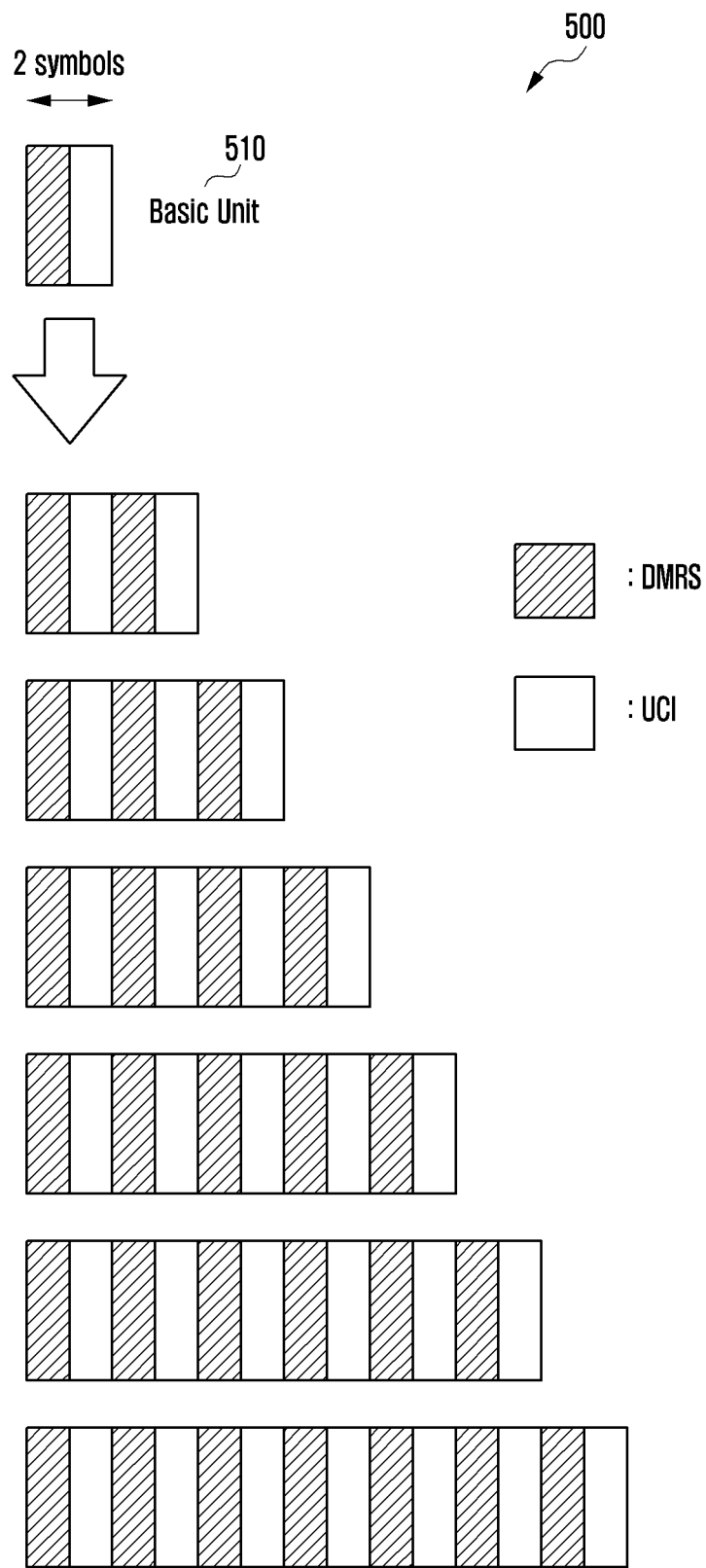
FIG. 5 illustrates an example of long-PUCCH design using a concatenated structure.
Figure 7:
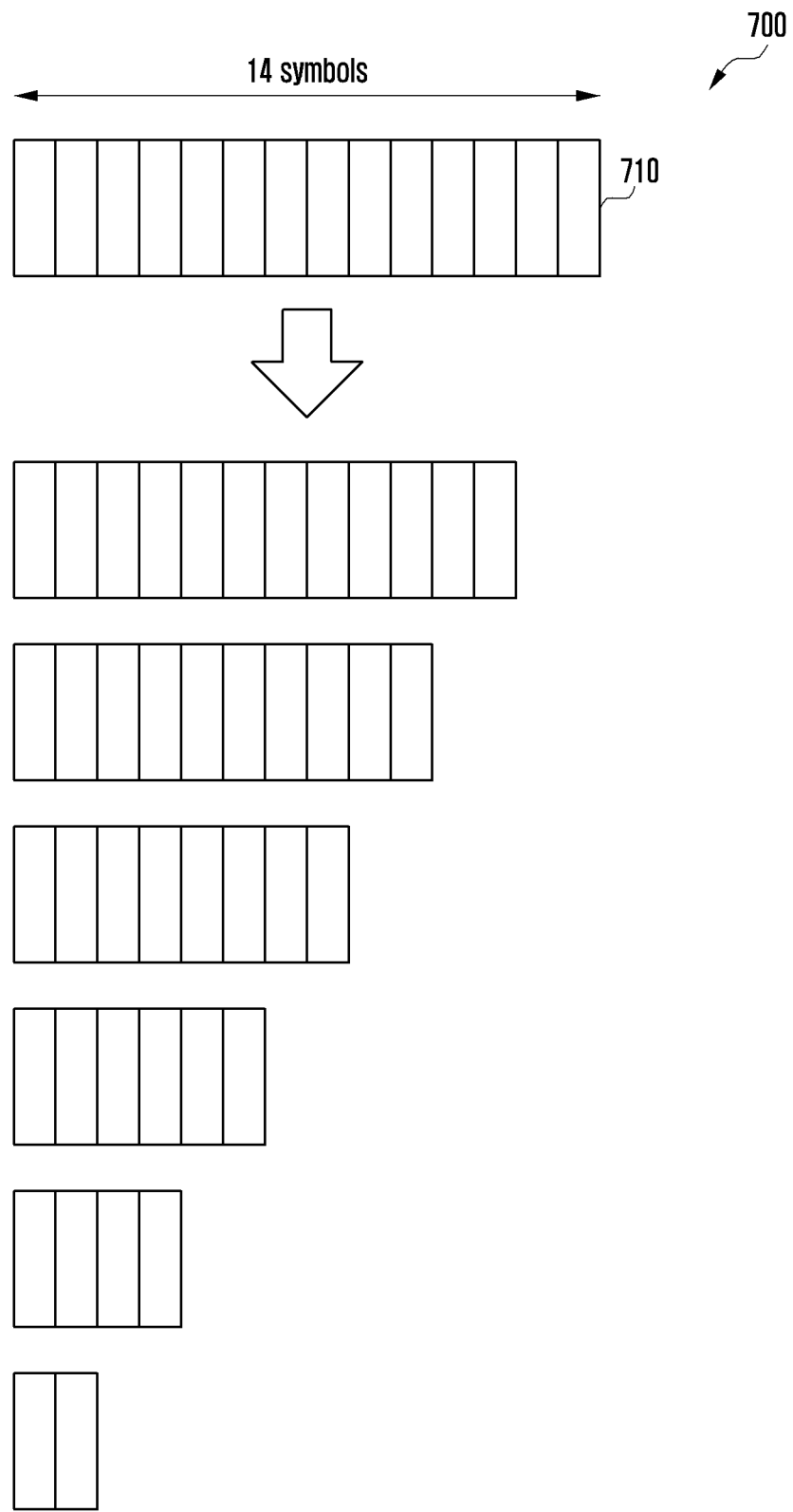
FIG. 7 illustrates an example of long-PUCCH design using a truncated structure.

In order to efficiently design the long PUCCH with respect to various cases, it is possible to design a long PUCCH using a concatenated structure as shown in the example in FIG. 5 or using a truncated structure as shown in the example in FIG. 7.

Figure 6:
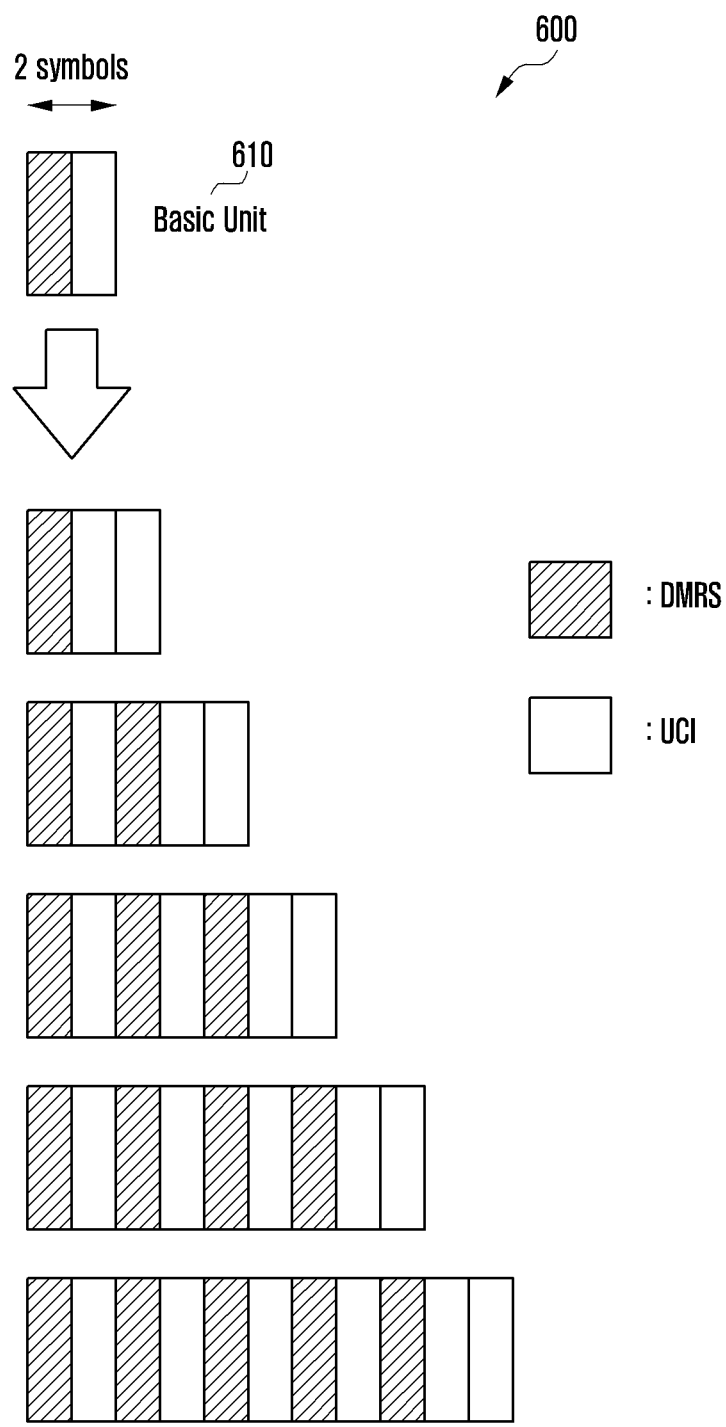
FIG. 6 illustrates another example of long-PUCCH design using a concatenated structure (a method of designing a long PUCCH having an odd number of symbols).

Design of long PUCCH using concatenated structure: A basic unit including a minimum number of symbols is defined first in the design using a concatenated structure, and if design of long PUCCHs having various symbol numbers is required, the number of symbols may be increased in units of the basic unit. That is, it is assumed that two symbols are defined as a basic unit 510 as illustrated in FIG. 5, and that one symbol is used for the transmission of a de-modulation reference signal (DMRS) and the other symbol is used for the transmission of uplink control information (UCI). In this case, long PUCCHs including 4, 6, 8, 10, 12, and 14 symbols may be designed through concatenation of the basic units. However, in the case of the design using the concatenated structure, the overheads of the DMRS always occupy 50% of the symbols, regardless of the number of symbols of the long PUCCH as shown in FIG. 5, which may be undesirable. In addition, the long PUCCHs including an odd number of symbols (e.g., 5, 7, 9, 11, and 13 symbols) cannot be supported by simple concatenation of the basic units. In order to reduce the DMRS overheads and support an odd number of symbols, the last symbol for the transmission of UCI may be added to the end of the concatenated long PUCCH as shown in FIG. 6. That is, a basic unit 610 including 2 symbols and one symbol added thereto may constitute a long PUCCH including 3 symbols. Likewise, a long PUCCH including 5 symbols may be configured by concatenating two basic units each including two symbols and by then adding one symbol to the concatenated symbol structure (including 4 symbols). FIG. 5 illustrates a basic unit including 2 symbols, in which one symbol is used for the DMRS and the other symbol is used for the UCI transmission, but it is possible to consider a basic unit including three or more symbols, in which one symbol is used for the DMRS and two symbols are used for the UCI transmission. In addition, the DMRS may not be positioned at the first symbol in the basic unit including three or more symbols. For example, it is possible to provide a basic unit structure configured as UCI+DMRS+UCI.

Figure 8:
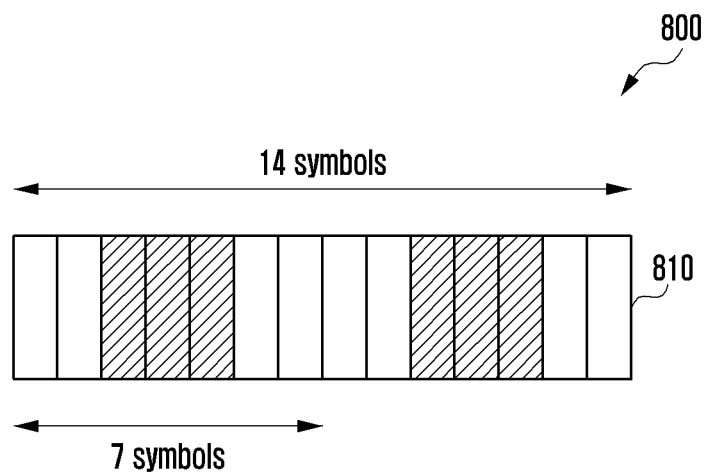
FIG. 8 illustrates an example of the structure of LTE PUCCH format 1/1a/1b.
Figure 9:
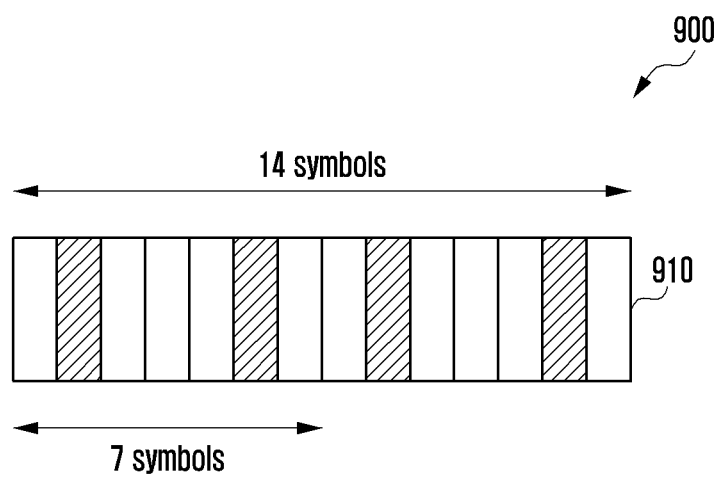
FIG. 9 illustrates an example of the structure of LTE PUCCH format 2/2a/2b.

Design of long PUCCH using truncated structure: Unlike the design of a PUCCH using the concatenated structure in which the basic unit including a minimum number of symbols is defined, a basic unit including a maximum number of symbols is defined first in the design using the truncated structure, and if design of long PUCCHs having various symbol numbers is required, the number of symbols may be reduced in the basic unit. That is, if 14 symbols are defined as the basic unit 710 as illustrated in FIG. 7, it is possible to design long PUCCHs having various symbol numbers while reducing the number of symbols. However, this method may be sensitive to a DMRS pattern. For example, if the DMRSs are positioned as illustrated in 810 of FIG. 8, the DMRSs must be truncated in order to support a long PUCCH including four symbols, which may be undesirable. As another example, if the DMRSs are positioned as illustrated in 910 of FIG. 9, the DMRSs must be truncated in order to support a long PUCCH including 12 symbols, which may be undesirable.

Meanwhile, frequency hopping may also be performed as shown in FIG. 1 or 2 in order to obtain frequency diversity in the long PUCCH design using the concatenated structure or the long PUCCH design using the truncated structure. In this case, if the long PUCCH includes an odd number of symbols, it may be necessary to determine the number of symbols that are used for performing frequency hopping. For example, if the long PUCCH includes 7 symbols, and if frequency hopping is configured by the base station within the TTI, it may be necessary to determine whether or not to perform hopping using 3 symbols of the first part and 4 symbols of the second part or whether or not to perform hopping using 4 symbols of the first part and 3 symbols of the second part. If the SRS or the short PUCCH is to be transmitted in the last symbol of the TTI, the last symbol of the long PUCCH may be punctured. Thus, in this case, it may be desirable to allocate more symbols to the second part. As another example, if the long PUCCH includes 7 symbols using a concatenated structure, the long PUCCH may have the structure "DMRS-UCI-DMRS-UCI-DMRS-UCI-UCI" as shown in FIG. 4. In this case, if hopping is performed using 3 symbols of the first part and 4 symbols of the second part, the first part includes "DMRS-UCI-DMRS" (3 symbols), and the second part includes "UCI-DMRS-UCI-UCI" (4 symbols). The first part unnecessarily includes two DMRSs, but the second part includes only one DMRS. It may be preferable to configure the first part as "DMRS-UCI" (2 symbols) and the second part as "DMRS-UCI-DMRS-UCI-UCI" (5 symbols) in order to improve the channel estimation performance.

Therefore, the symbol division for frequency hopping may be configured by the base station, and the configuration may be transmitted to the terminal through common RRC, UE-specific RRC, or group common DCI. In this case, the number of symbols of the first or second part for hopping may be indicated, or a pattern number may be indicated using a predetermined pattern. More specifically, in a long PUCCH including 7 symbols, pattern-1 may indicate "2 (first part)+5 (second part)", pattern-2 may indicate "3+4", and pattern-3 may indicate "3+3". In this case, pattern-3 indicates that although a total of 7 symbols may be used for the long PUCCH, frequency hopping is performed using only an even number of symbols without using the last symbol. The last symbol may be used for the transmission of an SRS or short PUCCH of another terminal, or the same terminal may use 6 symbols for the transmission of the long PUCCH, and may use the remaining one symbol for the transmission of the SRS.

Meanwhile, the sizes of UCI payloads may range from 1 bit to several hundred bits. The UCI payloads having various sizes must guarantee similar uplink performance, irrespective of the number of symbols constituting the long PUCCH. For example, when transmitting 100 bits of UCI, the performance of a long PUCCH including 4 symbols and the performance of a long PUCCH including 14 symbols need to be similar to each other. To this end, the number of time-frequency resources of the UCI transmitted through the long PUCCH needs to satisfy Equation 1 below.

$$N_1 \times m_1 \approx N_2 \times m_2 \quad \text{[Equation 1]}$$

Figure 10:
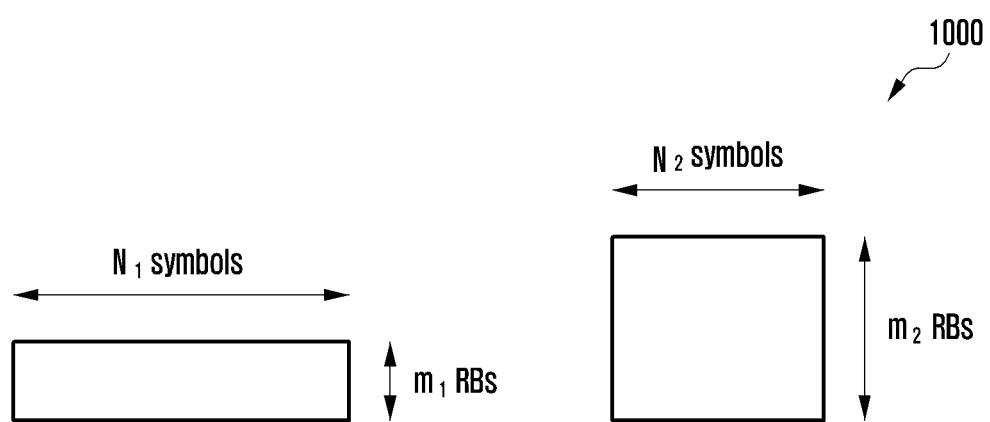
FIG. 10 illustrates an example of a change in the number of frequency resources of a long PUCCH according to a change in the number of time resources of a long PUCCH.

In Equation 1, N_1 or N_2 may denote the number of symbols of a long PUCCH, and m_1 or m_2 may be the number of resource blocks (RBs) or the number of subcarriers of a long PUCCH. That is, as illustrated in FIG. 10, if the number of symbols of a long PUCCH is reduced from N_1 to N_2, the number of RBs (or the number of subcarriers) of the long PUCCH may be increased from m_1 to m_2. On the other hand, if the number of symbols of a long PUCCH is increased from N_2 to N_1, the number of RBs (or the number of subcarriers) of the long PUCCH may be reduced from m_2 to m_1. In this case, N_1 and N_2 indicating the number of symbols of the long PUCCH may not include DMRS symbols. By this operation, it is possible to design long PUCCHs having various UCI payloads and various numbers of symbols with flexibility.

Table 3 is an example of various kinds of formats of a long PUCCH depending on the size of a UCI payload. If the UCI payload has a large size (e.g., a few hundred bits), it is necessary to reduce the number of symbols available for the DMRSs in the long PUCCH (to reduce the DMRS overheads) in order to lower a coding rate. On the other hand, if the UCI payload has a small size (e.g., 1 or 2 bits), it is possible to secure sufficient reception performance even without significantly reducing the coding rate, compared to the case where the UCI payload has a large size. Thus, it may not be necessary to reduce the DMRS overheads. Therefore, the DMRS overheads may be varied depending on the size of a UCI payload, which may require support of different long-PUCCH formats. Since too many long-PUCCH formats require a complicated system, it may be desirable to support as few long-PUCCH formats as possible. Therefore, a method proposed in the disclosure will be described on the basis of the three long-PUCCH formats shown in Table 4 below.

TABLE 3

| Formats | UCI payload, 0 [bits] | Channel coding |
| --- | --- | --- |
| 1 | 1 or 2 | Repetition or Sequence |
| 2 | $2 < 0 \leq X_2$ | Block code (e.g., Reed-Muller) |
| j | $X_{j-1} < 0 \leq X_j$ | Block code |
| k | $X_{k-1} < 0 \leq X_k$ | Polar code |
| n | $X_{n-1} < 0 \leq X_n$ | Polar code |

Table 3 above shows various formats of long PUCCHs according to the UCI payload size.

TABLE 4

| Formats | UCI payload, 0 [bits] | Effective coding rate | Channel coding |
| --- | --- | --- | --- |
| 1 | 1 or 2 | $R_1$ | Repetition or Sequence |
| 2 | $2 < 0 \leq X_2$ | $R_2$ | Block code (e.g., Reed-Muller) |
| 3 | $X_2 < 0 \leq X_4$ | $R_3$ | Polar code |

Table 4 above shows long-PUCCH formats according to the UCI payload size.

An effective coding rate (Rr) in Table 4 may be determined according to Equation 2 below.

$$R_r = \frac{O}{(N - D) \times m \times 12} \quad \text{[Equation 2]}$$

In Equation 2, "N" denotes the total number of symbols constituting a specific long-PUCCH format, and D denotes the number of symbols occupied by the DMRSs transmitted in a specific long-PUCCH format. "m" is the number of resource blocks (RBs) constituting a specific long-PUCCH format. For example, as shown in Table 4, format 1 of long PUCCHs is intended to transmit 1 bit or 2 bits of UCI. Long-PUCCH format 1 may be transmitted through various symbol numbers as shown in Table 1 or 2 above. Likewise, long-PUCCH format 2 may be used in the case where the UCI payload size is greater than 2 bits and less than or equal to X_2 bits, and may be transmitted through various numbers of symbols as shown in Table 1 or 2 above. In addition, long-PUCCH format 3 may be used in the case where the UCI payload size is greater than X_2 bits and less than or equal to X_3 bits, and may be transmitted through various numbers of symbols as shown in Table 1 or 2 above.

Figure 11:
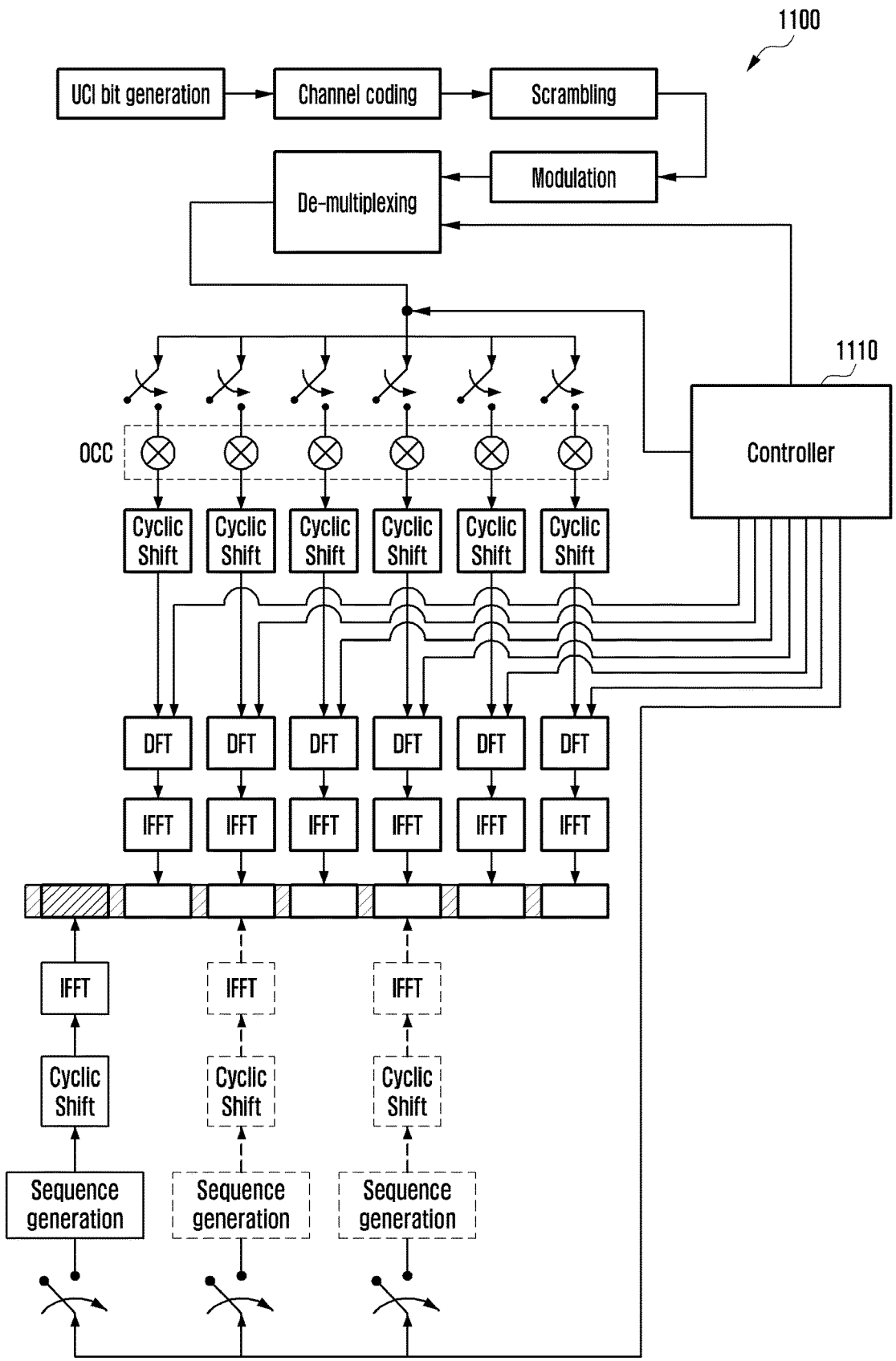
FIG. 11 illustrates an example of the structure of a transmitter of a terminal for transmitting UCI through a long PUCCH.

FIG. 11 shows the structure of a transmitter of a terminal for long-PUCCH format 3 (in the case there the UCI payload size is large) in Table 4 above. UCI 0 bits, which are generated by the terminal and which are greater than X_2 bits and less than or equal to X_3 bits, are channel-coded to M bits through channel coding. The channel-coded M bits are modulated via UE-specific scrambling. The modulated symbols are de-multiplexed and are then mapped with respective symbols of the long PUCCH. In this case, the controller 1110 of the terminal determines the DFT-S-OFDM symbols to be mapped with the modulated symbols, which is related to the number of symbols to be used in the long PUCCH. For example, if the long PUCCH includes 7 symbols (N=7), and if the first DFT-S-OFDM symbol is used for DMRS as illustrated in FIG. 10, the controller 1110 may use all six paths to map the modulated symbols. That is, the controller 1110 may determine the number of DFT-S-OFDM symbols available for the DMRSs, among the 7 long-PUCCH symbols, and may then turn on/off switches of the paths corresponding thereto. If the third DFT-S-OFDM symbol is used for the DMRS, the controller 1110 may turn off the switch such that the modulated symbols are not mapped with the third DFT-S-OFDM symbol. More specifically, if DFT-S-OFDM symbol 1 and DFT-S-OFDM symbol 3, among the seven DFT-S-OFDM symbols, are used for the DMRSs, DFT-S-OFDM symbols 2, 4, 5, 6, and 7 may be used in mapping of the modulated symbols (the paths of the corresponding DFT-S-OFDM symbols are turned on so as to be mapped with the modulated symbols). As another example, if the long PUCCH includes four DFT-S-OFDM symbols, and if the first DFT-S-OFDM symbol is used for the DMRS, the controller 1110 may turn off the switches of paths corresponding to DFT-S-OFDM symbols 5, 6, and 7. Switch-on/off of the paths may be performed by the controller 1110 or the de-multiplexer shown in FIG. 11 (or the de-multiplexer may be included in the controller).

The modulated symbols enter a DFT block by passing through an orthogonal cover code (OCC) block and a cyclic shift block. In this case, the controller 1110 may control frequency resources (RBs or subcarriers) available for the transmission of the long PUCCH according to Equation 1. More specifically, if the number of DFT-S-OFDM symbols available for the long PUCCH (the number of symbols in which the UCI may be transmitted, excluding the number of DMRSs) is N_1, the controller may configure the DFT size as m_1. In addition, if the number of DFT-S-OFDM symbols (the number of symbols in which the UCI may be transmitted, excluding the number of DMRSs) is N_2, the controller may configure the DFT size as m_2. The modulated symbols may be processed with IFFT via DFT blocks, and may then be mapped with DFT-S-OFDM symbols.

Figure 12:
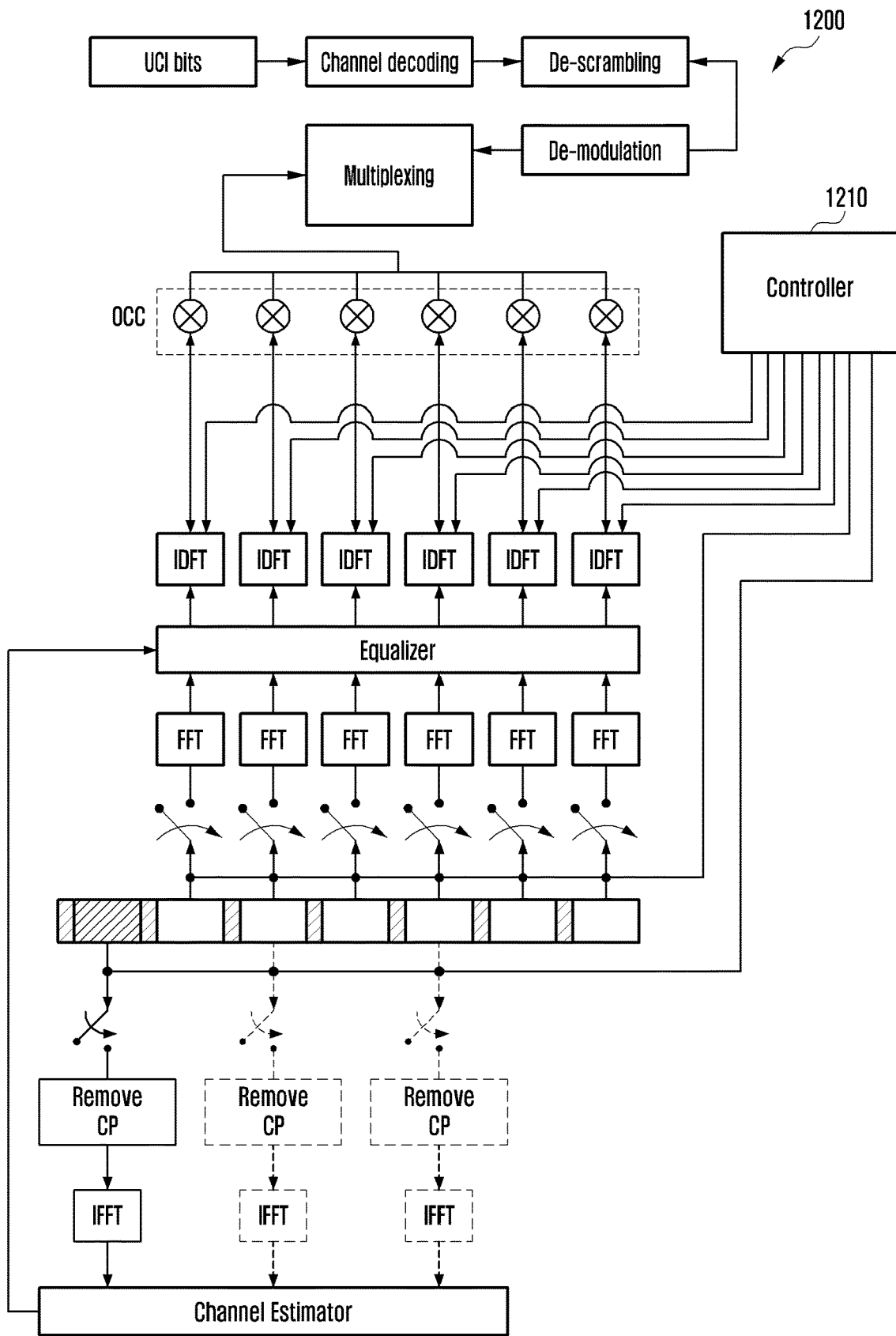
FIG. 12 illustrates an example of the structure of a base station receiver for receiving UCI.

FIG. 12 shows an example of the operation of a base station receiver in the case of long-PUCCH format 3 shown in Table 4 (in the case where the UCI payload has a large size). Like the controller 1210 provided in the transmitter of the terminal, the controller 1210 provided in the receiver of the base station determines the number of DFT-S-OFDM symbols to be switched on or off and determines whether or not to turn on or off the switches of corresponding paths depending on the number of DFT-S-OFDM symbols in which the DMRSs are transmitted. Channel estimation is performed on the DFT-S-OFDM symbol in which the DMRS path is turned on, and the result thereof is transmitted to an equalizer. Meanwhile, FFT is performed on the DFT-S-OFDM symbol in which the switch is turned on, and the result thereof is transmitted to the equalizer. The equalizer provides an input value of an IDFT block by utilizing an input value received from a channel estimator and the result value of FFT. The IDFT performs IDFT with an IDFT size determined according to the control of the controller 1210. In this case, the controller 1210 may determine the IDFT size according to the frequency resource of the long PUCCH determined by Equation 1. The result of the IDFT is transmitted to an OCC block so that the OCC used in the transmitter is removed and is input to a multiplexer. The subsequent blocks may be processed in the reverse order of the procedure performed in the transmitter.

Figure 13:
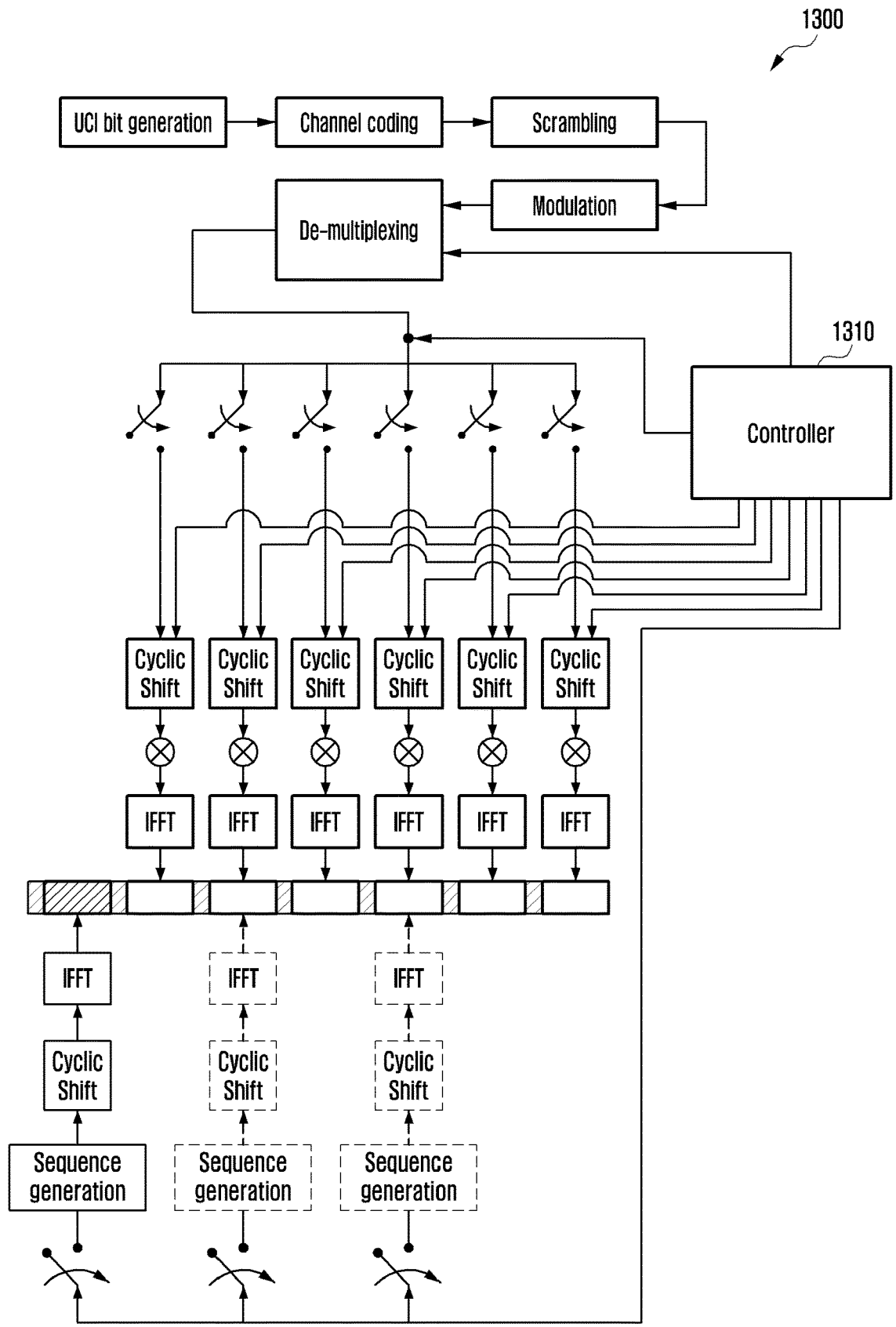
FIG. 13 illustrates another example of the structure of a transmitter of a terminal for transmitting UCI through a long PUCCH.

FIG. 13 shows the structure of a transmitter of a terminal in the case of long-PUCCH format 2 in Table 4 above (in the case where the UCI payload has a small size). The UCI 0 bits, which are generated in the terminal and which are greater than 2 bits and less than or equal to X_2 bits, are channel-coded to M bits through channel coding. The channel-coded M bits are modulated via UE-specific scrambling. The modulated symbols are de-multiplexed and are then mapped with the respective symbols of the long PUCCH. In this case, if a block code (e.g., Reed-Muller code: RM code) is used, the number of encoded bits may have a fixed value. For example, assuming RM (20, A), if an input value "A" is entered into a channel encoder, the output value of the channel encoder is fixed to 20 bits. In this case, the value "A" may be less than or equal to 13 bits. As another example, assuming RM (32, B), if an input value "B" is entered into the channel encoder, the output value of the channel encoder is fixed to 32 bits. In this case, "B" may be less than or equal to 11 bits.

Therefore, if the block codes are used, block codes supporting different sizes (supporting different output values) may be required in order to support long PUCCHs having various numbers of DFT-S-OFDM symbols. More specifically, if the output value of the block code is defined as M_bit, the number of modulated symbols may be $M\_symb=M\_bit/2$ (assuming QPSK modulation). If the number of DFT-S-OFDM symbols constituting the long PUCCH is defined as "N" and if the number of DFT-S-OFDM symbols used for DMRSs is defined as "D", the following cases may occur.

Case 1) $M_{symb}$=(N−D) DFT-S-OFDM symbols, for example, $M_{symb}$=(N−D)=10

Case 2) $M_{symb}$>(N−D) DFT-S-OFDM symbols, for example $M_{symb}$=10 and (N−D)=7

Case 3) $M_{symb}$<(N−D) DFT-S-OFDM symbols, for example, $M_{symb}$=10 and (N−D)=12

Case 1) is the same as LTE. More specifically, if the UCI payload size is 3 bits to 13 bits in LTE PUCCH format 2/2a/2b, RM (20, A) may be used. Since QPSK modulation is used, 10 modulated symbols are generated from the channel-coded 20 bits. Assuming NCP, the LTE PUCCH includes 14 DFT-S-OFDM symbols, and 4 symbols out of the 14 symbols are used for the DMRS transmission. Therefore, the number of DFT-S-OFDM symbols available for the UCI transmission is 10, which is equal to the number of QPSK modulated symbols. Assuming that 10 QPSK modulated symbols are d0, d1, . . . , and d9, each di (i∈∈{0,1, . . . , 9}) is spread at frequencies of DFT-S-OFDM symbols through a sequence having a length of 12 (12 subcarriers). That is, QPSK-modulated symbol d0 is spread at a frequency of DFT-S-OFDM symbol 1 through a sequence with a length of 12 (12 subcarriers), and QPSK-modulated symbol d1 is spread at a frequency of DFT-S-OFDM symbol 3 through a sequence with a length of 12 (12 subcarriers) (DFT-S-OFDM symbol 2 is for the DMRS transmission). Therefore, the above-mentioned problems may not occur.

However, Case 2) in which the number of QPSK-modulated symbols is greater than the number of DFT-S-OFDM symbols, or Case 3) in which the number of QPSK-modulated symbols is less than the number of DFT-S-OFDM symbols may cause a problem. In order to solve this problem, if the number of DFT-S-OFDM symbols is different from the number of modulated symbols, the number of subcarriers or the number of RBs on the frequency axis may be adjusted, as described in Equation 1.

More specifically, if the number of DFT-S-OFDM symbols is less than the number of modulated symbols as in Case 2) above, the number of resources (the number of subcarriers or the number of RBs) on the frequency axis may be increased. On the other hand, if the number of DFT-S-OFDM symbols is greater than the number of modulated symbols as in Case 3) above, the number of resources (the number of subcarriers or the number of RBs) on the frequency axis may be reduced.

Adding an additional description of Case 2) with reference to the example in FIG. 13, it is assumed that RM (20, A) is used and 10 QPSK-modulated symbols (M_symb=10)

generated through QPSK modulation are denoted as d0, d1, . . . , and d9. In addition, it is assumed that 7 DFT-S-OFDM symbols (N=7) are configured as the long PUCCH and three DFT-S-OFDM symbols are used for the DMRS transmission (D=3). That is, it is assumed that four DFT-S-OFDM symbols (N−D=4) are used for the UCI transmission and are denoted by s0, s1, s2, and s3, respectively. The controller 1310 in FIG. 13 may change frequency resources (the number of subcarriers or the number of RBs) used for the long PUCCH according to the number of DFT-S-OFDM symbols constituting the long PUCCH by Equation 1. More specifically, the controller 1310 may determine the size of a frequency resource (the number of RBs) such that a value obtained by multiplying the size of the frequency resource by (N−D) DFT-S-OFDM symbols is greater than or equal to the value M_symb {(N−D)×xm≥≥≥M_symb). In this case, if m=3 (36 subcarriers) is configured, 4×x3≥≥10 may be satisfied.

In FIG. 13, modulated symbol d0 may be mapped with s0 through a sequence having a length L. In this case, the sequence length L may be variable depending on the number of frequency resources (the number of subcarriers) used in the s0 transmission, or may be fixed to a specific value, regardless of the number of frequency resources. For example in which the sequence length L is variable depending on the frequency resources, if the number of subcarriers used in the transmission of the long PUCCH is 12, L=12, and if the number of subcarriers used in the transmission of the long PUCCH is 24, L=24. On the other hand, in the case where the sequence length is fixed to a specific value, regardless of the number of frequency resources, a sequence of a length L=12 (or L=6) may be repeatedly used. That is, if the number of frequency resources is 24, a sequence of L=12 may be used twice, or a sequence of L=6 may be used four times.

Figure 14:
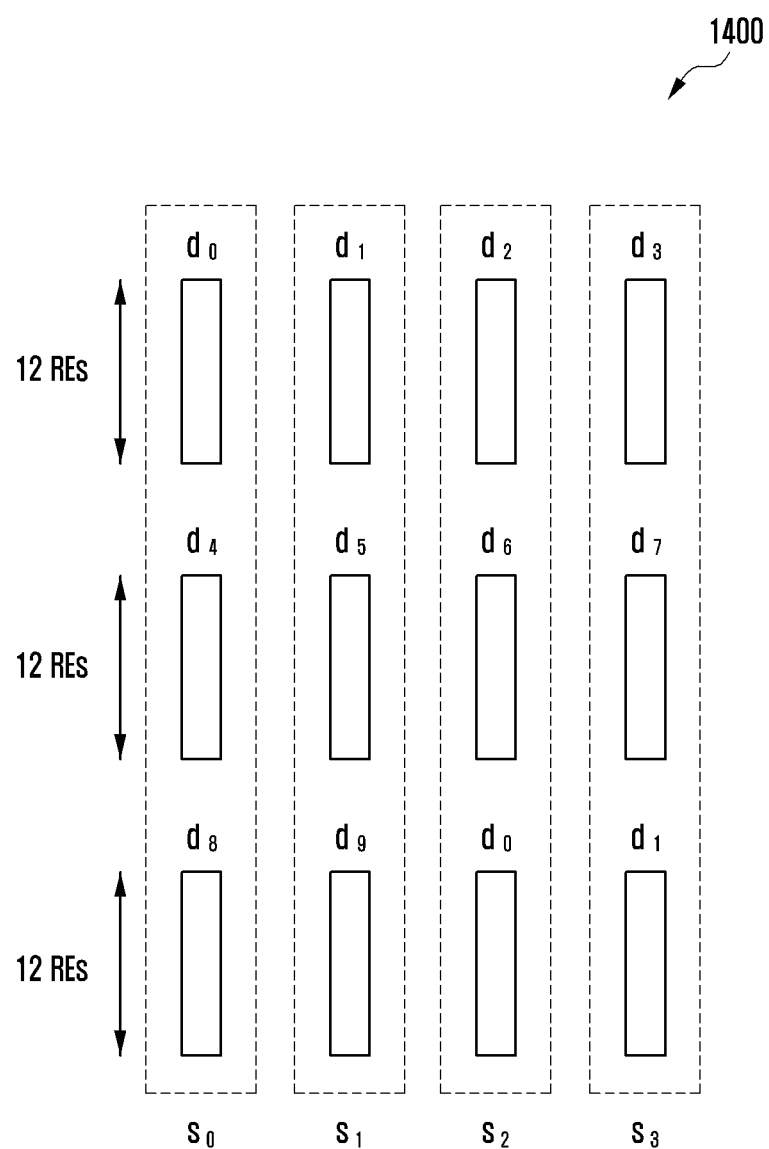
FIG. 14 illustrates an example of a mapping method in the case where the number of symbols of a long PUCCH is less than the number of modulated symbols of UCI.

FIG. 14 shows an example of a method of spreading a modulated symbol di (i=0, 1, . . . , 9) over a frequency axis and mapping the same with four DFT-S-OFDM symbols using a sequence having a length L. As illustrated above, since there are four DFT-S-OFDM symbols even though there are 10 modulated symbols, m=3 (36 subcarriers) may be used. In this case, the modulated symbols may be mapped with the respective symbols in the order of d0, d1, . . . , d9, d0, and d1 using circular repetition. Therefore, modulated symbols d0, d4, and d8 may be spread to DFT-S-OFDM symbol s0, and modulated symbols d1, d5, d9 may be spread to DFT-S-OFDM symbol s1. In addition, modulated symbols d2, d6, and d0 may be spread to DFT-S-OFDM symbol s2, and modulated symbols d3, d7, and d1 may be spread to DFT-S-OFDM symbol s3. In this case, as described in FIG. 13, the sequence for spreading the modulated symbols to DFT-S-OFDM symbols may differ between the modulated symbols (i.e., different sequences may be used in a single DFT-S-OFDM symbol), or the same sequence may be used in a single DFT-S-OFDM symbol. More specifically, for example of DFT-S-OFDM symbol s0, respective modulated symbols d0, d4, and d8 constituting DFT-S-OFDM symbol s0 may have L=12, and may use sequences having different cyclic shift values. Alternatively, if the same sequence is used in a single DFT-S-OFDM symbol, modulated symbols d0, d4, and d8 constituting DFT-S-OFDM symbol s0 may use a sequence having a length L=12 and the same cyclic shift value. As another example of the case where the same sequence is used in a single DFT-S-OFDM symbol, modulated symbols d0, d4, and d8 constituting DFT-S-OFDM symbol s0 may use a sequence having a length L=36 and the same cyclic shift value. In all of the above-mentioned cases, different DFT-S-OFDM symbols may use sequences having different cyclic shift values.

Figure 15:
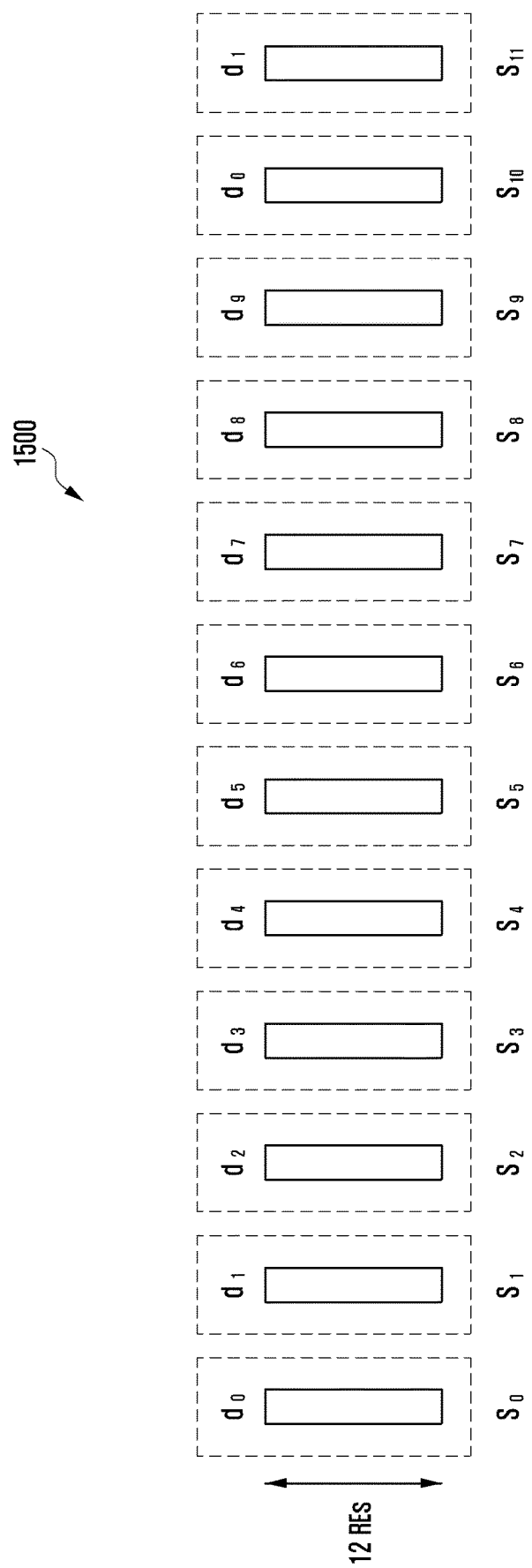
FIG. 15 illustrates an example of a mapping method in the case where the number of symbols of a long PUCCH is greater than the number of modulated symbols of UCI.

On the other hand, if the number of DFT-S-OFDM symbols is greater than the number of modulated symbols as in Case 3), it may not necessary to change the resources on the frequency axis (the number of subcarrier or the number of RBs). Adding an additional description of Case 3) with reference to the example in FIG. 13, it is assumed that RM (20, A) is used and 10 QPSK-modulated symbols (M_symb=10) generated through QPSK modulation are denoted as d0, d1, . . . , and d9. In addition, it is assumed that 14 DFT-S-OFDM symbols (N=14) are configured as the long PUCCH and two DFT-S-OFDM symbols are used in the DMRS transmission (D=2). That is, it is assumed that 12 DFT-S-OFDM symbols (N−D=12) are used in the UCI transmission and are denoted as s0, s1, . . . , and s11, respectively. The controller 1310 in FIG. 13 may provide an input value to the de-multiplexer, and may then map the modulated symbols with the DFT-S-OFDM symbols as shown in FIG. 15. FIG. 12 shows an example of a method of spreading a modulated symbol di (i=0, 1, . . . , 9) over a frequency axis and mapping the same with 12 DFT-S-OFDM symbols using a sequence having a length L=12. As illustrated above, since there are 12 DFT-S-OFDM symbols even though there are 10 modulated symbols, the modulated symbols may be mapped with the respective DFT-S-OFDM symbols in the order of d0, d1, . . . , d9, d0, and d1 using circular repetition. In this case, different DFT-S-OFDM symbols may use sequences having different cyclic shift values. However, in order to reduce complexity, DFT-S-OFDM symbols s0 and s10, to which the same modulated symbol d0 is spread, may use a sequence having the same cyclic shift value, and DFT-S-OFDM symbols s1 and s11, to which the same modulated symbol d1 is spread, may use a sequence having the same cyclic shift value.

Figure 16:
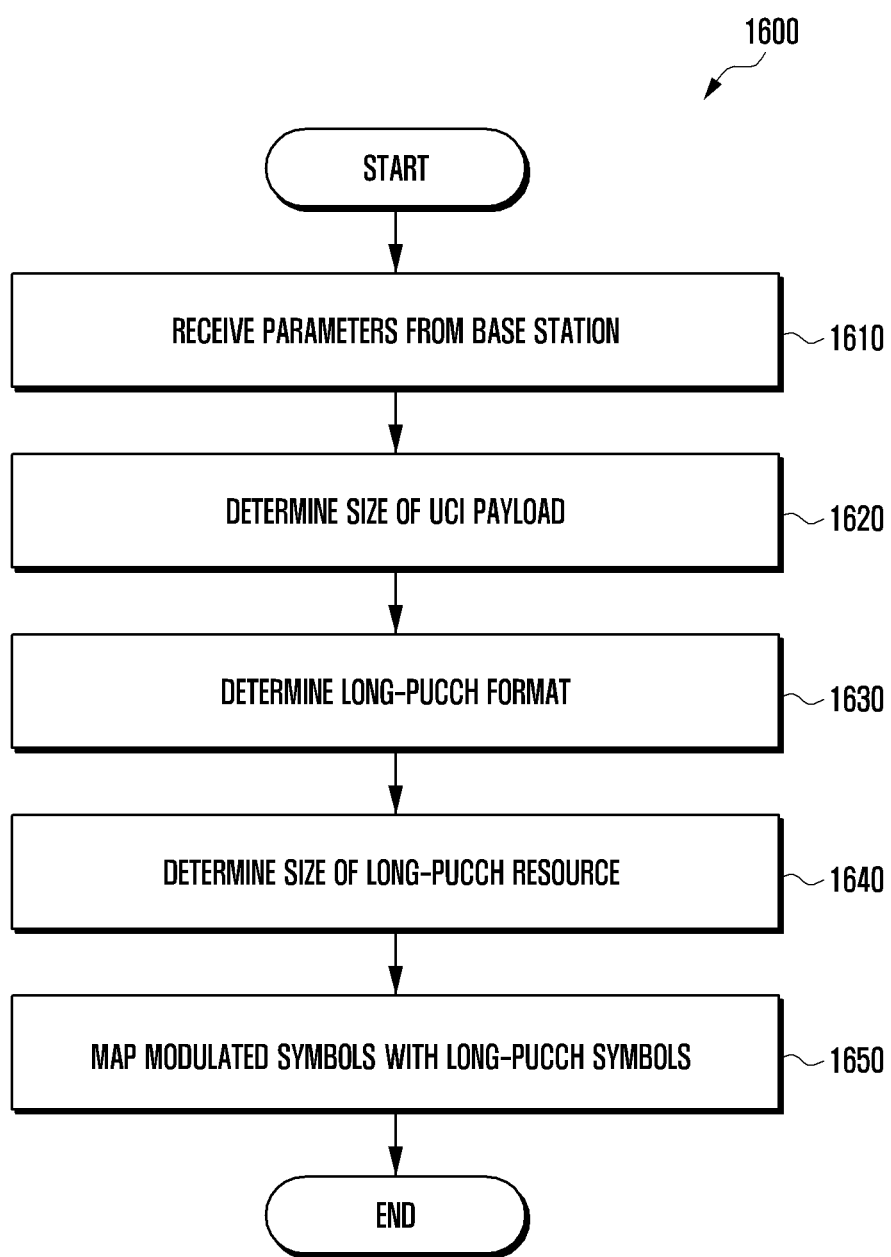
FIG. 16 is a flowchart illustrating the operation of the terminal shown in FIGS. 11 and 13.

FIG. 16 is a flowchart illustrating the operation of the terminal shown in FIGS. 11 and 13. The terminal may receive parameters for the UCI transmission from the base station (1610), and may use the same to determine the size of a UCI payload (1620). For example, the parameters may include information about the configuration of UCI. That is, the parameters may include information about at least one of HARQ ACK/NACK, CQI/PMI, RI, and beam measurement information (information on the quality of a downlink beam measured by the terminal, the index of the corresponding beam, etc.), which constitutes the UCI. In addition, the parameters may include a parameter for the terminal to determine the bit-size of each piece of UCI information. For example of HARQ ACK/NACK, if several downlink subframes or CA (carrier aggregation) are supported, the parameters may include information on the number of component carriers (CCs) indicated by ACK/NACK. These various parameters may be transmitted from the base station through common RRC, UE-specific RRC, group common DCI, or UE-specific DCI, and the terminal receives the same and then determines the size of a UCI payload (1620).

After determining the size of a UCI payload, the terminal determines a long-PUCCH format according to the size of a UCI payload as shown in Table 3 or 4 (1630). For example, if long-PUCCH format 3 is determined according to the size of a UCI payload (if the size of UCI is less than or equal to X2 bits) as shown in Table 4, the terminal determines the sizes of time-frequency resources of the long PUCCH (1640). In this case, the base station may determine all time-frequency resources of the long PUCCH, and may transmit the configuration thereof to the terminal. Alternatively, the base station may determine one of the time or frequency resources, and may transmit the configuration thereof to the terminal, so that the terminal may directly determine the remaining resources according to rules defined between the base station and the terminal without the configuration from the base station. For example, the base station may configure the number of symbols available for the long PUCCH, and the terminal may determine the size of a frequency resource used for the long PUCCH according to Equation 1 (1650).

In the case where the base station indicates a time resource of the long PUCCH to the terminal, the following options may be taken into consideration.

Option 1) the case where all symbols capable of performing uplink transmission may be used as long-PUCCH symbols: It is assumed that one TTI (1 slot) includes N DFT-S-OFDM (or CP-OFDM) symbols and that the first one symbol is used for a PDCCH and the second one symbol is used for a guard (gap). In this case, the remaining (N−2) symbols may be used in the long-PUCCH transmission. Accordingly, the terminals that wish to transmit the long PUCCH in the corresponding TTI may receive information on the slot structure from the base station. The information on the slot structure may be transmitted from the base station through RRC or group common DCI, and the information on the slot structure may include the total number of symbols constituting the slot and a pattern predetermined between the base station and the terminal. For example, the total number of symbols constituting the slot may represent "0"=7 symbols (Type 1) and "1"=14 symbols (Type 2). On the other hand, as an example of a pattern of the slot, the base station may represent 000=pattern 1, 001=pattern 2, . . . , and 111=pattern 8 on the assumption that eight patterns are defined. Depending on the number of patterns to be supported, the number of bits representing the pattern may be varied, and the pattern may be varied depending on the number of symbols of the PDCCH, the number of symbols of the gap (guard), or the number of symbols of the physical downlink shared channel (PDSCH) provided in the corresponding TTI. As another example of the information on the slot structure, the base station may inform the terminal of the type of slot, the number of symbols used in the PDCCH, and the number of symbols used in the gap, which are mentioned above, through RRC or group common DCI. As a more specific example of the transmission of the slot structure information through the group common DCI, 1 most significant bit (MSB) or 1 LSB may denote the type of slot, and the remaining bits may denote the numbers of symbols used in the PDCCH and the gap. Alternatively, the respective numbers of symbols used for the type of slot, the PDCCH, and the gap may constitute independent fields.

Meanwhile, in Option 1, the last one symbol of the long PUCCH may be used to transmit 1-symbol short PUCCH or SRS. In addition, in Option 1, the last two symbols of the long PUCCH may be used to transmit 2-symbol short PUCCHs. In this case, the terminal may puncture the corresponding symbol or symbols. The base station may inform the terminal, through group common DCI or UE-specific DCI, of whether or not the terminal is to puncture the symbols used as the short PUCCH or the SRS in the TTI in which the long PUCCH is transmitted. For example, the base station may configure a slot (or subframe) in which a symbol (or symbols) capable of transmitting the short PUCCH or the SRS is likely to exist through common RRC or UE-specific RRC signaling, and may indicate whether or not a corresponding symbol (or symbols) is to be punctured in a specific slot (or subframe) through group common DCI or UE-specific DCI.

Option 2) the case where some of the symbols capable of performing uplink transmission may be used as long-PUCCH symbols: It is assumed that one TTI (1 slot) includes N DFT-S-OFDM (or CP-OFDM) symbols and that the first one symbol is used for a PDCCH and the second one symbol is used for a guard (gap). In this case, the remaining (N−2) symbols may be used in the transmission of uplink data or control information. Option 2) in which some of the (N−2) symbols may be used in the long-PUCCH transmission is different from Option 1) in which all of the (N−2) symbols are used in the long-PUCCH transmission. For example, if two of the (N−2) symbols are used for the short PUCCH, the base station may inform the terminal that (N−4) symbols are available for the long PUCCH. Therefore, unlike Option 1) in which (N−2) symbols are generated and the last two symbols are punctured, rate matching may be performed on (N−4) symbols in Option 2). In this case, the base station may explicitly inform the terminal of the number of symbols available for the SRS or the short PUCCH.

If the base station indicates frequency resources of a long PUCCH to the terminal, the following options may be taken into consideration.

Option 1) Implicit indication: The base station may signal the starting point of frequency resources (the index of an RB) at which the long PUCCH starts to the terminal through RRC or group common DCI. The starting point of frequency resources may differ between terminals. As another example, the base station may inform the terminal of the start point of frequency resources, and may acquire information on the size of a frequency resource of the long PUCCH from the control channel element (CCE) index of the UE-specific DCI received by the terminal. Meanwhile, the base station may inform the terminal of only the starting point of frequency resources at which the long PUCCH starts, and the terminal may determine the size of a frequency resource (the size of an RB) by itself so as to conform to the rule determined according to the number of DFT-S-OFDM symbols, as shown in Equation 1 above.

Option 2) Explicit indication: Information on the frequency RB index and the size of a frequency RB of the long PUCCH may be transmitted through UE-specific DCI, RRC, or group common DCI. In this case, a set of frequency RB indexes may be configured through the RRC, and the index to be actually used, among the configured set, may be indicated through the UE-specific DCI.

Meanwhile, information about whether or not frequency hopping is supported and information about the frequency hopping bandwidth and hopping symbol units (if hopping is supported) may be indicated by the base station through RRC or group common DCI. For example, if the long PUCCH includes 7 symbols and if the frequency hopping is configured by the base station in the TTI, the hopping symbol units may be the information on whether or not to perform hopping using 3 symbols in the first part and 4 symbols in the second part, whether or not to perform hopping using 4 symbols in the first part and 3 symbols in the second part, or whether or not to perform hopping using 2 symbols in the first part and 5 symbols in the second part.

Figure 17:
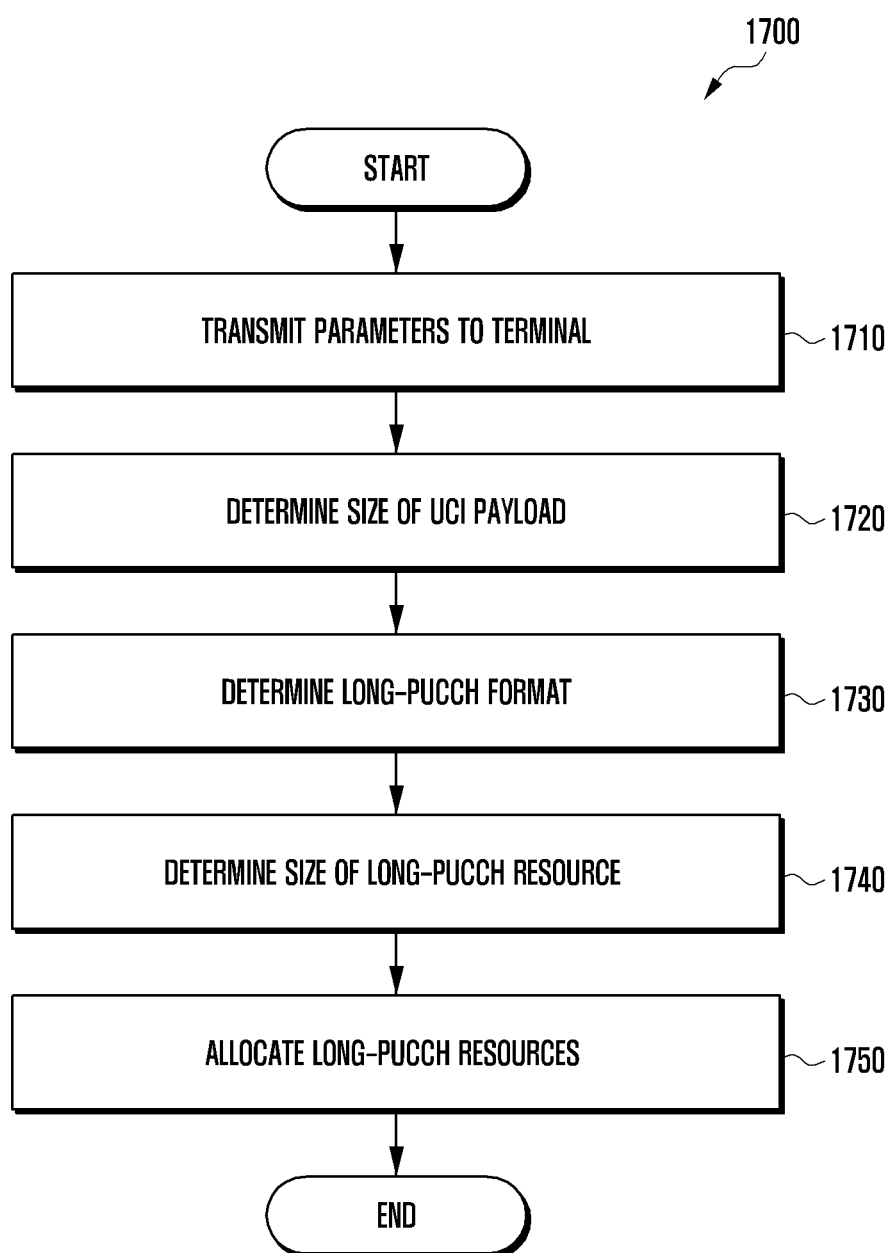
FIG. 17 is a flowchart illustrating the operation of the base station for performing the operations shown FIGS. 11 and 13.

FIG. 17 is a flowchart illustrating the operation of the base station for performing the operations shown FIGS. 11 and 13. The base station transmits parameters that may be used by the terminal to determine the size of a UCI payload (1710). For example, the parameters may include information about at least one of HARQ ACK/NACK, CQI/PMI, RI, and beam measurement information (information on the quality of a downlink beam measured by the terminal, the index of the corresponding beam, etc.), which constitutes the UCI. In addition, the parameters may include a parameter for the terminal to determine the bit-size of each piece of UCI information. For example of HARQ ACK/NACK, if several downlink subframes or CA (carrier aggregation) are supported, the parameters may include information on the number of component carriers (CCs) indicated by ACK/NACK. These various parameters may be transmitted from the base station through common RRC, UE-specific RRC, group common DCI, or UE-specific DCI, and the terminal may receive the same, and may then determine the size of a UCI payload.

Meanwhile, the base station may determine the time at which the above-described information is transmitted from the terminal, and may determine the size of a UCI payload (1720). For example, HARQ ACK may be transmitted from the terminal in the "$n^{th}$" subframe, CQI/PMI may be transmitted from the terminal in the "$(n+k)^{th}$" subframe, and beam measurement information may be transmitted from the terminal in the "$(n+j)^{th}$" subframe. As another example, all UCI information may be multiplexed, and may then be transmitted simultaneously from the terminal in the "$n^{th}$" subframe. Accordingly, the base station having transmitted the parameters may obtain the time at which the corresponding UCI information is transmitted from the terminal, and may determine or predict the size of a payload of the UCI transmitted from the terminal in a specific subframe (1720).

Upon determining or predicting the size of a UCI payload, the base station determines a long-PUCCH format according to the size of a UCI payload as shown in Table 3 or 4 (1730). For example, if long-PUCCH format 3 is determined according to the size of a UCI payload (if the size of UCI is smaller than or equal to X2 bits) as shown in Table 4, the base station may determine the sizes of time-frequency resources of the long PUCCH that may be transmitted by the terminal in the "$n^{th}$" subframe (1740). In this case, the base station may determine all time-frequency resources of the long PUCCH, and may transmit the configuration thereof to the terminal. Alternatively, the base station may determine one of the time or frequency resources, and may transmit the configuration thereof to the terminal, so that the terminal may directly determine the remaining resources according to rules defined between the base station and the terminal without the configuration from the base station. For example, the base station may configure the number of symbols available for the long PUCCH, and the terminal may determine the size of a frequency resource used in the long PUCCH according to Equation 1.

In the case where the base station indicates (configures) time resources of the long PUCCH to the terminal, the following options may be taken into consideration (1750).

Option 1) the case where all symbols that can be received by the base station through the uplink in a specific subframe (e.g., the "$n^{th}$" subframe) may be used as long-PUCCH symbols: It is assumed that one TTI (1 slot) includes N DFT-S-OFDM (or CP-OFDM) symbols and that the first one symbol is used for a PDCCH and the second one symbol is used for a guard (gap). In this case, the remaining (N−2) symbols may be used in the reception of the long-PUCCH. Accordingly, the base station that wishes to receive the long PUCCH in the corresponding TTI may transmit information on the slot structure to the terminal. The information on the slot structure may be transmitted from the base station through RRC or group common DCI, and the information on the slot structure may include the total number of symbols constituting the slot and a pattern predetermined between the base station and the terminal. For example, the total number of symbols constituting the slot may represent "0"=7 symbols (Type 1) and "1"=14 symbols (Type 2). On the other hand, as an example of a pattern of the slot, the base station may represent 000=pattern 1, 001=pattern 2, . . . , and 111=pattern 8 on the assumption that eight patterns are defined. Depending on the number of patterns to be supported, the number of bits representing the pattern may be varied, and the pattern may be varied depending on the number of symbols of a PDCCH, the number of symbols of a gap (guard), or the number of symbols of a physical downlink shared channel (PDSCH) provided in the corresponding TTI. As another example of the information on the slot structure, the base station may inform the terminal of the type of slot, the number of symbols used in the PDCCH, and the number of symbols used in the gap, which are mentioned above, through the RRC or the group common DCI. As a more specific example of the transmission of the slot structure information through the group common DCI, 1 most significant bit (MSB) or 1 LSB may denote the type of slot, and the remaining bits may denote the numbers of symbols used in the PDCCH and the gap. Alternatively, the respective numbers of symbols used for the type of slot, the PDCCH, and the gap may constitute independent fields.

Meanwhile, in Option 1, the last one symbol of the long PUCCH may be used to transmit 1-symbol short PUCCH or SRS. In addition, in Option 1, the last two symbols of the long PUCCH may be used to transmit 2-symbol short PUCCHs. The base station may transmit the information to the terminal, and the terminal may receive the information, and may then puncture the corresponding symbol or symbols. The base station may inform the terminal, through group common DCI or UE-specific DCI, of whether or not the terminal is to puncture the symbols used as the short PUCCH or the SRS in the TTI in which the long PUCCH is transmitted. For example, the base station may configure a slot (or subframe) in which a symbol (or symbols) capable of transmitting the short PUCCH or the SRS is likely to exist through common RRC or UE-specific RRC signaling, and may indicate whether or not a corresponding symbol (or symbols) is to be punctured in a specific slot (or subframe) through the group common DCI or the UE-specific DCI.

Option 2) the case where some of the symbols that can be received by the base station through the uplink in a specific subframe (e.g., "$n^{th}$" subframe) may be used as long-PUCCH symbols: It is assumed that one TTI (1 slot) includes N DFT-S-OFDM (or CP-OFDM) symbols and that the first one symbol is used for a PDCCH and the second one symbol is used for a guard (gap). In this case, the remaining (N−2) symbols may be used in the transmission of uplink data or control information. Option 2) in which some of the (N−2) symbols may be used in the long-PUCCH transmission is different from Option 1) in which all of the (N−2) symbols are used in the long-PUCCH transmission. For example, if two of the (N−2) symbols are used for the short PUCCH, the base station may inform the terminal that (N−4) symbols are available for the long PUCCH. Therefore, unlike Option 1) in which (N−2) symbols are generated and the last two symbols are punctured, rate matching may be performed on the (N−4) symbols in Option 2). In this case, the base station may explicitly inform the terminal of the number of symbols available for the SRS or the short PUCCH.

In the case where the base station indicates (configures) frequency resources of the long PUCCH to the terminal, the following options may be taken into consideration (1750).

Option 1) Implicit indication: The base station may signal the starting point of frequency resources (an index of an RB) at which the long PUCCH starts to the terminal through RRC or group common DCI signaling. The starting point of frequency resources may differ between terminals. As another example, the base station may inform the terminal of the start point of frequency resources, and may acquire information on the size of a frequency resource of the long PUCCH from the control channel element (CCE) index of the UE-specific DCI received by the terminal. Meanwhile, the base station may inform the terminal of only the starting point of frequency resources at which the long PUCCH starts, and the terminal may determine the size of a frequency resource (the size of an RB) by itself so as to conform to the rule determined according to the number of DFT-S-OFDM symbols, as shown in Equation 1 above.

Option 2) Explicit indication: Information on the frequency RB index and the size of a frequency RB of the long PUCCH may be transmitted through UE-specific DCI, RRC, or group common DCI. In this case, a set of frequency RB indexes may be configured through the RRC, and the index to be actually used, among the configured set, may be indicated through the UE-specific DCI.

Meanwhile, information about whether or not frequency hopping is supported and information about the frequency hopping bandwidth and hopping symbol units (if hopping is supported) may be indicated by the base station through RRC or group common DCI. For example, if the long PUCCH includes 7 symbols and if the frequency hopping is configured by the base station in the TTI, the hopping symbol units may be the information on whether or not to perform hopping using 3 symbols in the first part and 4 symbols in the second part, whether or not to perform hopping using 4 symbols in the first part and 3 symbols in the second part, or whether or not to perform hopping using 2 symbols in the first part and 5 symbols in the second part.

Figure 18:
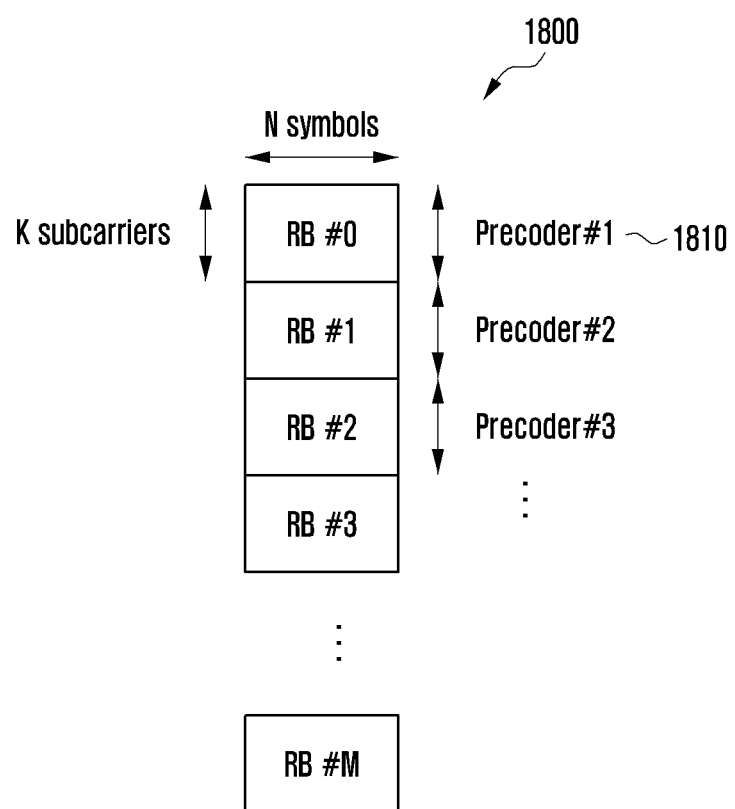
FIG. 18 illustrates an example of the case where different precoders are used in units of one RB on a frequency axis.
Figure 19:
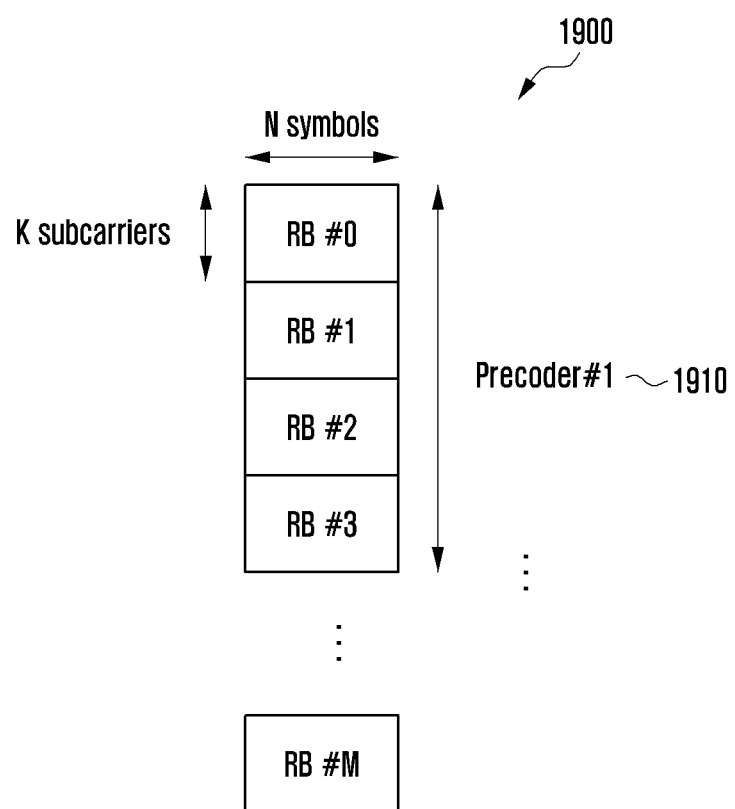
FIG. 19 illustrates an example of the case where different precoders are used in units of a RB group (four RBs constitute one RB group) on a frequency axis.

Meanwhile, in order to improve the reception reliability of the long PUCCH, an antenna diversity scheme may be used in the transmitter (terminal). In the disclosure, precoder cycling (PC) is considered as a transmission antenna diversity scheme. In a cyclic prefix-orthogonal frequency division multiplexing (CP-OFDM) scheme, different precoders may be used in units of one RB on the frequency axis (1810) as shown in FIG. 18, or different precoders may be used for respective ones of RB groups as shown in FIG. 19 {an example in which four RBs constitute one RB group (1910)}. Frequency selectivity may be artificially generated at the transmitter using the PC scheme above, thereby further obtaining frequency diversity. The scheme in FIG. 18 may further increase the frequency selectivity, compared with the scheme in FIG. 19, thereby maximizing the frequency diversity. However, since the channel estimation must be performed in units of one RB in FIG. 18, the channel estimation performance may deteriorate, compared to that in FIG. 19. For example, since interpolation of the frequency axis may be performed using all reference signals (RSs) transmitted in four RBs (one RB group) in FIG. 19, the channel estimation performance may be further improved. However, since interpolation of the frequency axis is performed using only the RSs transmitted in one RB in FIG. 18, the channel estimation performance may be degraded, compared to that in FIG. 19. Therefore, it can be seen that there is a trade-off relationship between an increase in the frequency selectivity and an improvement in the channel estimation performance.

Figure 20:
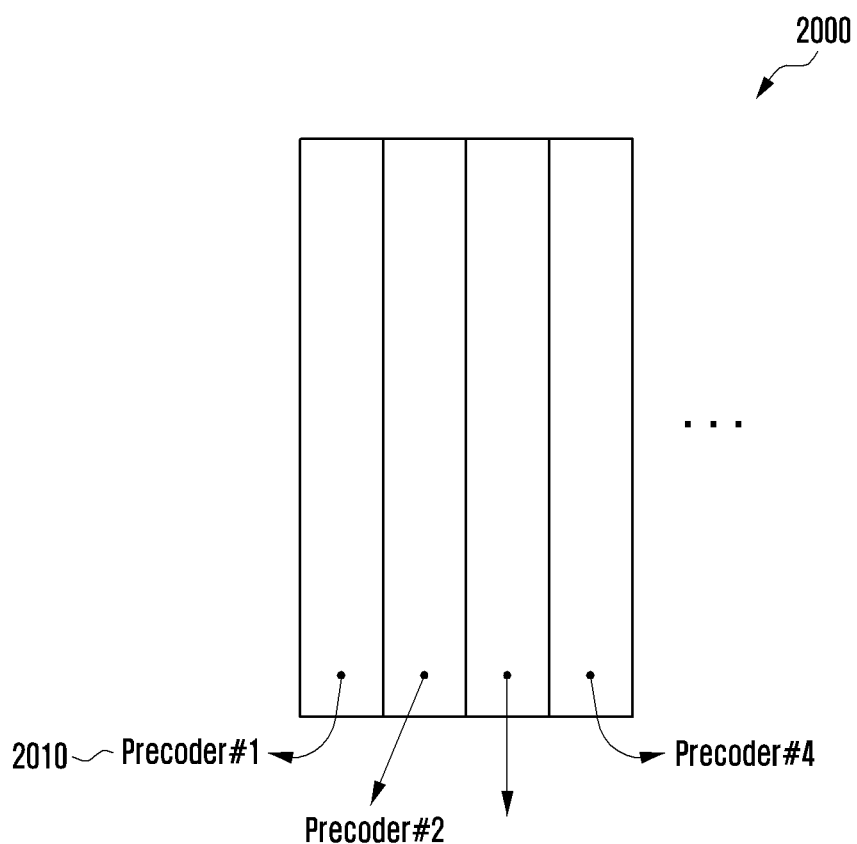
FIG. 20 illustrates an example of the case where different precoders are used in units of one symbol on a time axis.
Figure 21:
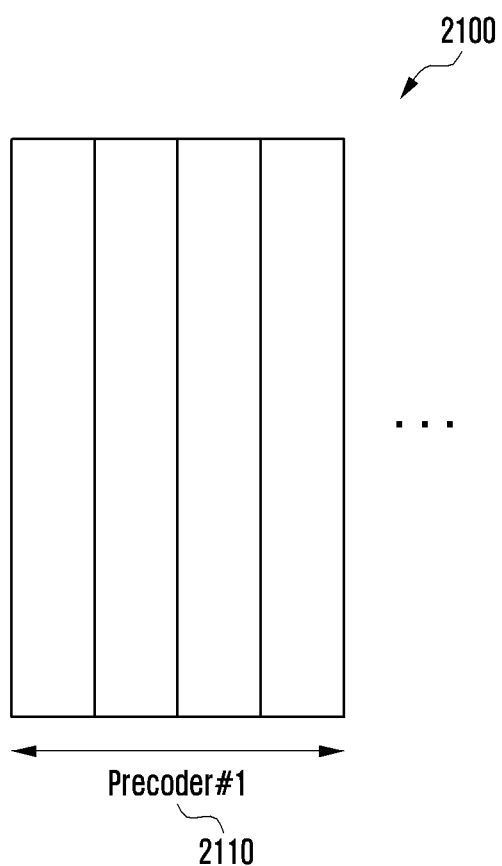
FIG. 21 illustrates an example of the case where different precoders are used in units of a symbol group (four symbols constitute one symbol group) on a time axis.

However, the PC scheme on the frequency axis mentioned in FIGS. 18 and 19 may not be directly applied to the long PUCCH. This is due to the fact that the long PUCCH a better peak-to-average power ratio (PAPR) performance than that of the CP-OFDM because the long PUCCH uses a discrete Fourier transform-spread-orthogonal frequency division multiplexing (DFT-S-OFDM) waveform. This stems from the fact that the DFT-S-OFDM is able to maintain single carrier characteristics. Thus, if the PC scheme on the frequency axis is directly introduced to the DFT-S-OFDM, the single carrier characteristics of the DFT-S-OFDM may no longer be maintained, thereby degrading the PAPR performance. Therefore, a system using the DFT-S-OFDM must use the PC scheme on the time axis, instead of the PC scheme on the frequency axis, in order to maintain the PAPR characteristics. The PC scheme on the time axis may be implemented by applying different precoders to respective DFT-S-OFDM symbols (2010) or by using different precoders for each unit including two or more DFT-S-OFDM symbols (2110), as shown in FIGS. 20 and 21. For example, FIG. 20 illustrates that different precoders are applied to the respective DFT-S-OFDM symbols, and FIG. 21 illustrates that different precoders are applied to respective units of two or more DFT-S-OFDM symbols (four DFT-S-OFDM symbols use one precoder).

Figure 22:
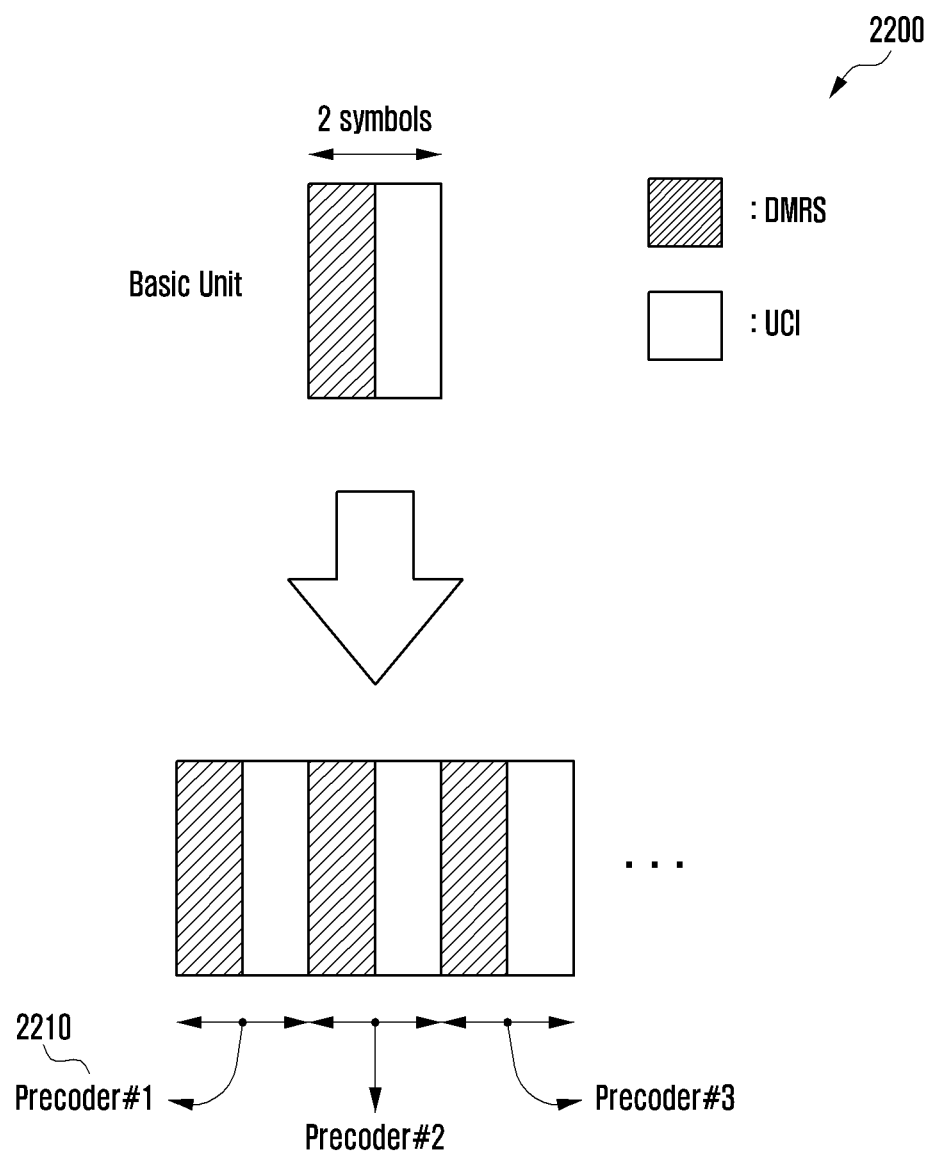
FIG. 22 illustrates an example of a method of applying a precoder cycling (PC) scheme to a long PUCCH on a time axis.

In order to operate the PC scheme on the time axis, the receiver must be aware of the number of symbols constituting the unit to which the same precoder is applied in the transmitter. This information may follow rules predetermined between the base station and the terminal, or may be transmitted from the base station to the terminal through separate signaling (e.g., common RRC/dedicated RRC signaling or DCI). For example, FIG. 22 shows a method of applying the PC scheme on the time axis to the long PUCCH (Option 1). FIG. 22 is based on the assumption that a 2-symbol basic unit includes one symbol for the DMRS transmission and the other symbol for the UCI transmission and that a long PUCCH includes 6 symbols or more. In this case, the base station and the terminal may preliminarily promise that different precoders are used in units of a basic unit of the long PUCCH (2210). Although not illustrated in FIG. 22, different precoders may be used in units of the basic unit in the long PUCCH structures illustrated in FIGS. 5 and 6. This may also be applied to a basic unit including three or more symbols in the same manner, in addition to the basic unit including two symbols.

Figure 23:
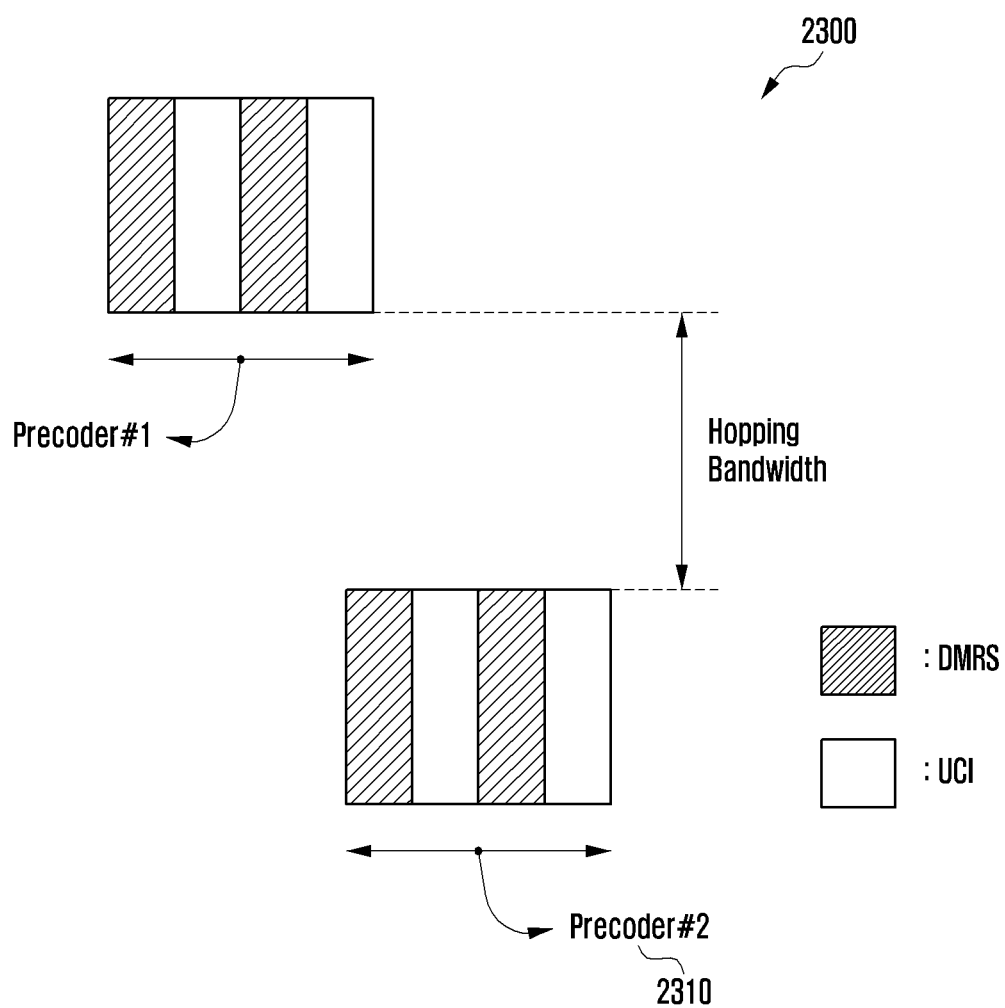
FIG. 23 illustrates another example of a method of applying a precoder cycling (PC) scheme to a long PUCCH on a time axis.

Another example of applying the PC scheme on the time axis to the long PUCCH is shown in FIG. 23 (Option 2). Unlike the scheme in FIG. 22 in which different precoders are applied to the respective basic units constituting the long PUCCH, FIG. 23 illustrates that different precoders may be applied in units of symbols in which frequency hopping is performed. That is, although the basic unit constituting the long PUCCH is 2 symbols, if frequency hopping is performed in a 4-symbol unit, different precoders may be used in units of 4 symbols (2310). Although FIG. 23 shows the long PUCCH including 8 symbols, this scheme may be applied to a long PUCCH including an even number of symbols in the same manner. For example, in a long PUCCH including 10 symbols, if frequency hopping is performed in a 5-symbol unit, different precoders may be used in units of 5 symbols. On the other hand, the above example may be applied to a long PUCCH including an odd number of symbols in a similar manner. For example, in a long PUCCH including 9 symbols, frequency hopping may be performed in units of 5 symbols and 4 symbols, or frequency hopping may be performed in units of 4 symbols and 5 symbols. In this case, different precoders may be applied depending on the hopping unit. Option 2 is characterized in that the number of frequency hoppings performed in one slot determines the number of precoders that may be used in one slot. For example, if frequency hopping is performed once in one slot, up to two precoders may be used in one slot.

Figure 24:
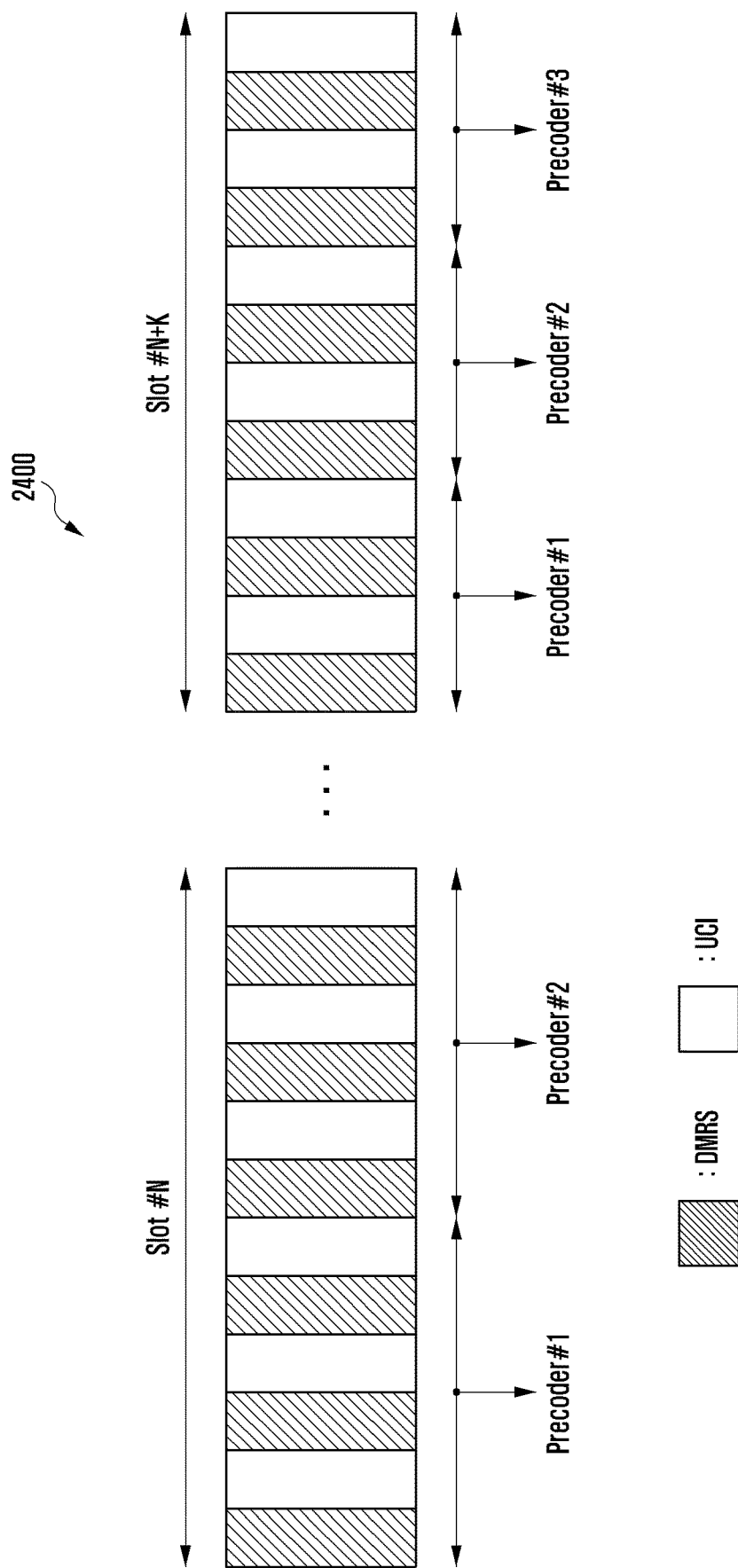
FIG. 24 illustrates another example of a method of applying a precoder cycling (PC) scheme to a long PUCCH on a time axis.

Another example of applying the PC scheme on the time axis to the long PUCCH is shown in FIG. 24 (Option 3). Option 3 in FIG. 24 is different from Option 1 in FIG. 22 and Option 2 in FIG. 23 described above in that the base station transmits, to the terminal, information about a time-axis unit to which the same precoder is applied (a symbol or a group including two or more symbols) through separate signaling. Therefore, the base station may configure a time-axis unit, to which the same precoder is applied, to the terminal through common RRC/dedicated RRC signalling, or may indicate a time-axis unit, to which the same precoder is applied, to the terminal through DCI. For example, it is assumed that a long PUCCH includes 12 symbols in FIG. 24. In this case, the base station may signal to the terminal to apply the same precoder in units of 6 symbols in the $N^{th}$ slot, and may signal to the terminal to apply the same precoder in units of 4 symbols in the $(N+K)^{th}$ slot. In this way, it is possible for the base station to flexibly determine whether to improve the channel estimation performance or the frequency diversity gain according to the movement speed of the terminal and the characteristics of the channel. More specifically, since a high speed of the terminal causes a big change in the time axis of the channel, it is necessary to improve the channel estimation performance rather than securing the frequency diversity gain. In this case, since the channel estimation performance may be improved by performing interpolation on the time axis through a plurality of DMRSs, it is necessary to increase the time-axis unit to which the same precoder may be applied (the $N^{th}$ slot). On the other hand, since a low speed of the terminal causes a small change in the time axis of the channel, it is preferable for improvement of system performance to secure the frequency diversity gain rather than improving the channel estimation performance. Thus, in this case, it is possible to reduce the time-axis unit to which the same precoder may be applied {the $(N+K)^{th}$ slot}.

Figure 25:
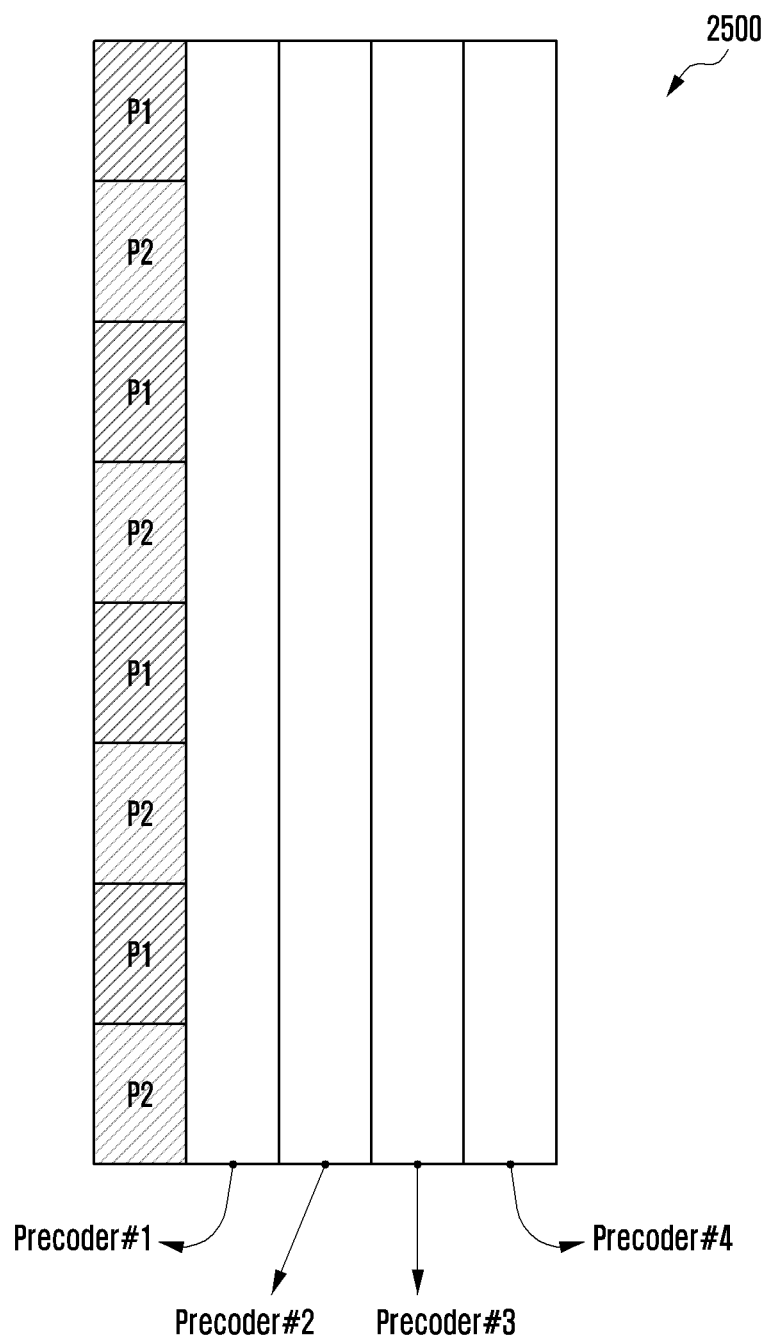
FIG. 25 illustrates an example of a method of applying a time-axis precoder cycling (PC) scheme to a long PUCCH in a terminal having two antenna ports.

Meanwhile, if the terminal has two or more antenna ports, the PC scheme on the time axis may be applied by transmitting the orthogonal DMRS by each antenna port. For example, FIG. 25 shows an example in which a time-axis PC scheme is applied to a terminal having two antenna ports. In order to maintain the orthogonality of the DMRS for each antenna port, the DMRS transmitted through the first symbol is frequency-division-multiplexed (FDM) as shown in FIG. 25. That is, the antenna port #1 (indicated by P1 in FIG. 25) and the antenna port #2 (indicated by P2 in FIG. 25) are frequency-division-multiplexed. It is assumed that a precoder [1 1 1 1] is used in the long PUCCH transmitted through antenna port #1 and a precoder [1 j −1 −j] is used in the long PUCCH transmitted through antenna port #2. It is also assumed that the receiver has precoder information for each antenna port of the transmitter. Further, it is assumed that a channel established through the antenna port #1 is h1 and a channel established through the antenna port #2 is h2. Under these assumptions, the receiver is aware that the second symbol with precoder #1 is subject to the channel h1+h2, the third symbol with precoder #2 is subject to the channel h1+jh2, the fourth symbol with precoder #3 is subject to the channel h1−h2, and the fifth symbol with precoder #4 is subject to the channel h1−jh2, thereby decoding the UCI information.

Figure 26:
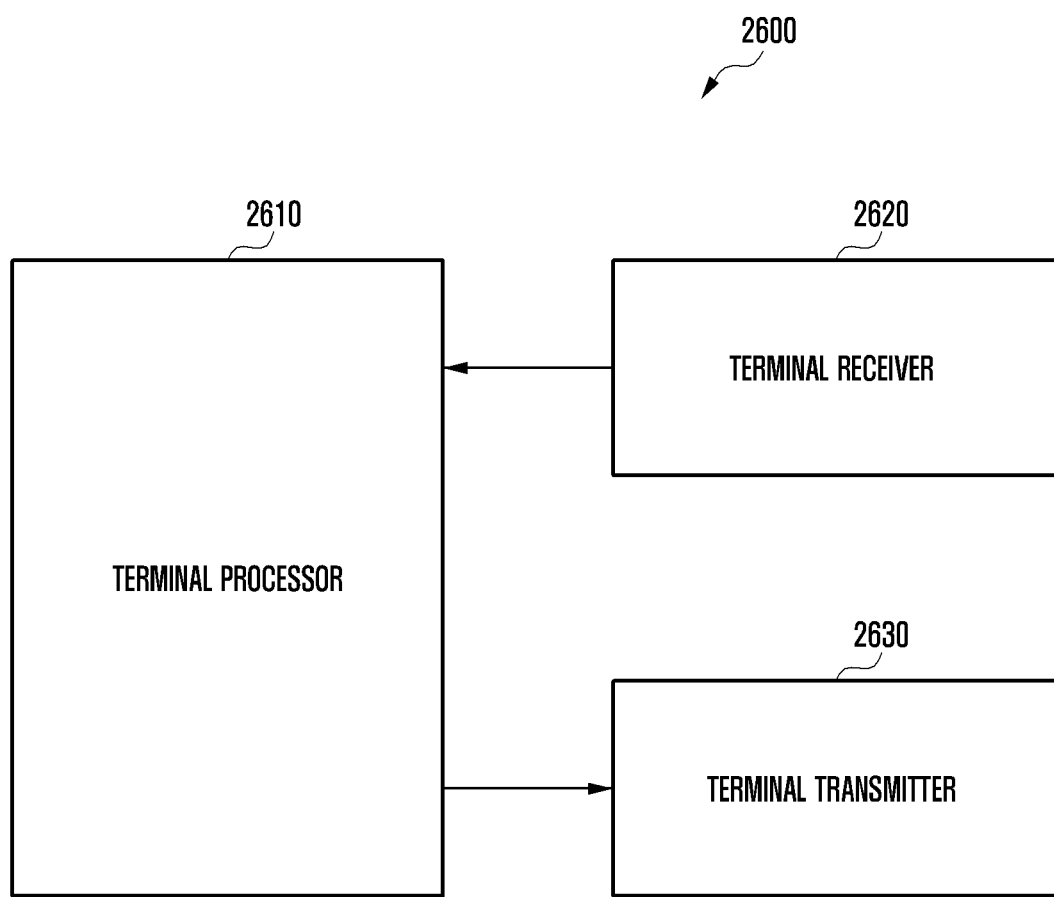
FIG. 26 is a diagram illustrating the configuration of a terminal according to the disclosure.

FIG. 26 is a diagram illustrating the configuration of a terminal according to the disclosure.

A terminal according to the disclosure may receive parameters from a base station through a terminal receiver 2620. Based on the parameters, a terminal processor 2610 may determine the size of a UCI payload, may determine a long-PUCCH format, may determine the size of a long-PUCCH resource, and may map the modulated symbols with the long-PUCCH symbols. In addition, the terminal may transmit a signal generated based on the operation of the terminal processor 2610 through a terminal transmitter 2630.

Figure 27:
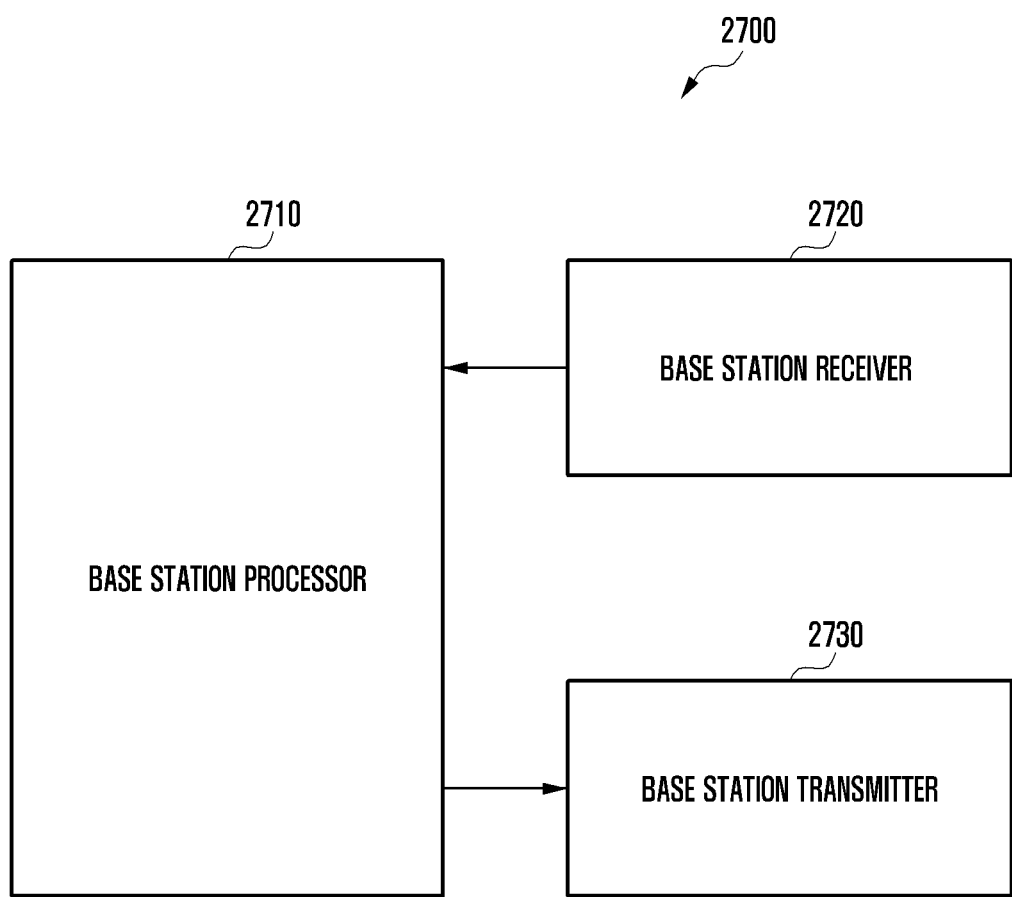
FIG. 27 is a diagram illustrating the configuration of a base station according to the disclosure.

FIG. 27 is a diagram illustrating the configuration of a base station according to the disclosure.

A base station according to the disclosure may transmit parameters to a terminal through a base station transmitter 2730. A terminal processor 2710 may determine the size of a UCI payload, may determine a long-PUCCH format according to the size of a UCI payload, may determine the size of a long-PUCCH resource, and may allocate long-PUCCH resources. Meanwhile, a base station receiver 2720 may receive a signal generated based on the operation of the terminal that received the parameters.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination.

The invention claimed is:

1. A method performed by a terminal in a wireless communication system, the method comprising:
  receiving, from a base station, a control message including first information on a number of a plurality of orthogonal frequency division multiplexing (OFDM) symbols for a physical uplink control channel (PUCCH) and second information enabling an intra-slot frequency hopping for the PUCCH, wherein a number of the plurality of OFDM symbols is equal to or larger than 4 and is equal to or smaller than 14;
  generating uplink control information (UCI);
  generating a demodulation reference signal (DMRS) for the PUCCH;
  mapping the UCI and the DMRS to the plurality of OFDM symbols for the PUCCH based on the first information; and
  transmitting, to the base station on the PUCCH, the UCI and the DMRS in the plurality of OFDM symbols by applying the intra-slot frequency hopping based on the second information,
  wherein the DMRS is mapped to odd-numbered OFDM symbols among the plurality of OFDM symbols, and the UCI is mapped to even-numbered OFDM symbols among the plurality of OFDM symbols, and
  wherein a first part of the PUCCH which is before the intra-slot frequency hopping has number of OFDM symbols equal to or smaller than a second part of the PUCCH which is after the intra-slot frequency hopping.

2. The method of claim 1, further comprising identifying a PUCCH format 1 for the PUCCH, based on a number of bits of the UCI being 1 or 2.

3. The method of claim 1, wherein the UCI includes at least one of a hybrid automatic repeat request acknowledgement (HARQ-ACK) or a scheduling request (SR).

4. A terminal in a wireless communication system, the terminal comprising:
a transceiver configured to transmit or receive a signal; and
a controller coupled with the transceiver and configured to:
receive, from a base station, a control message including first information on a number of a plurality of orthogonal frequency division multiplexing (OFDM) symbols for a physical uplink control channel (PUCCH) and second information enabling an intra-slot frequency hopping for the PUCCH, wherein a number of the plurality of OFDM symbols is equal to or larger than 4 and is equal to or smaller than 14,
generate uplink control information (UCI),
generate a demodulation reference signal (DMRS) for the PUCCH,
map the UCI and the DMRS to the plurality of OFDM symbols for the PUCCH based on the first information, and
transmit, to the base station on the PUCCH, the UCI and the DMRS in the plurality of OFDM symbols by applying the intra-slot frequency hopping based on the second information,
wherein the DMRS is mapped to odd-numbered OFDM symbols among the plurality of OFDM symbols, and the UCI is mapped to even-numbered OFDM symbols among the plurality of OFDM symbols, and
wherein a first part of the PUCCH which is before the intra-slot frequency hopping has number of OFDM symbols equal to or smaller than a second part of the PUCCH which is after the intra-slot frequency hopping.

5. The terminal of claim 4, wherein the controller is further configured to identify a PUCCH format 1 for the PUCCH, based on a number of bits of the UCI being 1 or 2.

6. The terminal of claim 4, wherein the UCI includes at least one of a hybrid automatic repeat request acknowledgement (HARQ-ACK) or a scheduling request (SR).

7. A method performed by a base station in a wireless communication system, the method comprising:
transmitting, to a terminal, a control message including first information on a number of a plurality of orthogonal frequency division multiplexing (OFDM) symbols for a physical uplink control channel (PUCCH) and second information enabling an intra-slot frequency hopping for the PUCCH, wherein a number of the plurality of OFDM symbols is equal to or larger than 4 and is equal to or smaller than 14;
receiving, from the terminal on the PUCCH, uplink control information (UCI) and a demodulation reference signal (DMRS) for the PUCCH in the plurality of OFDM symbols for the PUCCH based on the first information, wherein the intra-slot frequency hopping is applied to the PUCCH based on the second information; and
obtaining the UCI based on the DMRS,
wherein the DMRS is mapped to odd-numbered OFDM symbols among the plurality of OFDM symbols, and the UCI is mapped to even-numbered OFDM symbols among the plurality of OFDM symbols, and
wherein a first part of the PUCCH which is before the intra-slot frequency hopping has number of OFDM symbols equal to or smaller than a second part of the PUCCH which is after the intra-slot frequency hopping.

8. The method of claim 7, wherein a number of bits of the UCI is 1 or 2, and a PUCCH format 1 is identified for the PUCCH.

9. The method of claim 7, wherein the UCI includes at least one of a hybrid automatic repeat request acknowledgement (HARQ-ACK) or a scheduling request (SR).

10. A base station in a wireless communication system, the base station comprising:
a transceiver configured to transmit or receive a signal; and
a controller coupled with the transceiver and configured to:
transmit, to a terminal, a control message including first information on a number of a plurality of orthogonal frequency division multiplexing (OFDM) symbols for a physical uplink control channel (PUCCH) and second information enabling an intra-slot frequency hopping for the PUCCH, wherein a number of the plurality of OFDM symbols is equal to or larger than 4 and is equal to or smaller than 14,
receive, from the terminal on the PUCCH, uplink control information (UCI) and a demodulation reference signal (DMRS) for the PUCCH in the plurality of OFDM symbols for the PUCCH based on the first information, wherein the intra-slot frequency hopping is applied to the PUCCH based on the second information, and
obtain the UCI based on the DMRS,
wherein the DMRS is mapped to odd-numbered OFDM symbols among the plurality of OFDM symbols, and the UCI is mapped to even-numbered OFDM symbols among the plurality of OFDM symbols, and
wherein a first part of the PUCCH which is before the intra-slot frequency hopping has number of OFDM symbols equal to or smaller than a second part of the PUCCH which is after the intra-slot frequency hopping.

11. The base station of claim 10, wherein a number of bits of the UCI is 1 or 2, and a PUCCH format 1 is identified for the PUCCH.

12. The base station of claim 10, wherein the UCI includes at least one of a hybrid automatic repeat request acknowledgement (HARQ-ACK) or a scheduling request (SR).

* * * * *